US008370835B2

(12) United States Patent
Dittmer

(10) Patent No.: US 8,370,835 B2
(45) Date of Patent: Feb. 5, 2013

(54) METHOD FOR DYNAMICALLY GENERATING A CONFIGURATION FOR A VIRTUAL MACHINE WITH A VIRTUAL HARD DISK IN AN EXTERNAL STORAGE DEVICE

(76) Inventor: Arend Erich Dittmer, San Rafael, CA (US)

( * ) Notice: Subject to any disclaimer, the term of this patent is extended or adjusted under 35 U.S.C. 154(b) by 833 days.

(21) Appl. No.: 12/402,494

(22) Filed: Mar. 12, 2009

(65) Prior Publication Data
US 2010/0235831 A1 Sep. 16, 2010

(51) Int. Cl.
G06F 9/455 (2006.01)
G06F 9/445 (2006.01)
G06F 12/00 (2006.01)
(52) U.S. Cl. ............. 718/1; 718/104; 717/174; 711/115
(58) Field of Classification Search ........................ None
See application file for complete search history.

(56) References Cited

U.S. PATENT DOCUMENTS

| | | | | |
|---|---|---|---|---|
| 7,529,897 B1 * | 5/2009 | Waldspurger et al. | ........ | 711/162 |
| 8,091,084 B1 * | 1/2012 | Dobrovolskiy et al. | ...... | 717/174 |
| 2006/0070085 A1 * | 3/2006 | Bao et al. | ....................... | 719/319 |
| 2007/0079065 A1 * | 4/2007 | Bonella et al. | ................ | 711/113 |
| 2007/0079307 A1 * | 4/2007 | Dhawan et al. | .................... | 718/1 |
| 2007/0209035 A1 * | 9/2007 | Sonderegger et al. | ............ | 718/1 |
| 2008/0168188 A1 * | 7/2008 | Yue et al. | ......................... | 710/15 |
| 2008/0215796 A1 * | 9/2008 | Lam et al. | ..................... | 711/100 |
| 2008/0271025 A1 * | 10/2008 | Gross et al. | .................... | 718/102 |
| 2009/0119664 A1 * | 5/2009 | Pike et al. | ......................... | 718/1 |
| 2009/0132816 A1 * | 5/2009 | Lee | ................................. | 713/164 |
| 2010/0042753 A1 * | 2/2010 | Whaley et al. | ................... | 710/13 |

* cited by examiner

*Primary Examiner* — Meng An
*Assistant Examiner* — Tammy Lee

(57) ABSTRACT

A sequence of programs enable execution of a guest operating system (OS) (116) installed on virtual hard disks (VHDs), one storing system, one storing user data (210, 212). The VHDs are stored on a storage device as for example a USB flash drive (216). The storage device is connected to a host system (110). Virtual machine monitor (VMM) (118) type, available RAM and an access path to an internal storage device (220) are detected. The guest OS (116) configuration is modified to support hardware emulated by the detected VMM. A virtual machine (VM) configuration for this VMM is created allocating a portion of the detected RAM for the VM (112). Both VHDs are attached as copy-on-write VHDs, and VM write operations to VHDs (210, 212) are redirected to overlay files (228, 230) on the host's internal storage device. After shutdown overlay files can be merged with corresponding VHD base files.

9 Claims, 22 Drawing Sheets

METHOD FOR DYNAMICALLY GENERATING A CONFIGURATION FOR A VIRTUAL MACHINE WITH A VIRTUAL HARD DISK IN AN EXTERNAL STORAGE DEVICE

BACKGROUND

1. Prior-Art

This patent application contains a large number of technical terms a layman may not be familiar with. A glossary providing a short explanation of these terms is available on page 10.

A virtual machine monitor (VMM) is a software program that emulates a computer system. A computer would run a VMM in order to enable the concurrent execution of additional operating system (OS) instances. The additional OS instances run in what is referred to as a virtual machine. A virtual machine consists of 'virtual' emulated hardware resources such as a CPU, graphics- and network-adapters, hard disks and hard disk controllers. Each virtual machine runs one OS instance, for example Linux or Microsoft Windows. The computer executing the VMM is referred to as a host system, each OS instance running in a virtual machine is referred to as guest OS. The technology is referred to as full virtualization (see http://en.wikipedia.org/wiki/Full_virtualization, Mar. 10, 2009) but will in the following only be referred to as 'virtualization'.

Each guest OS runs applications in an isolated environment, independent of the other OS' and the host OS. The host system controls access of the virtual machines to the available hardware resources, such as a physical memory, graphics-, network-, or sound-adapters. The guest OS is typically installed on a virtual hard disk. A virtual hard disk is a large file that contains the complete content and structure of a physical hard disk.

Virtualization is often used in datacenters where applications are tied to operating system installations that each run on a single computer system. It is common that applications deployed in this way only use a fraction of a system's compute capacity. Virtualization allows for replacing multiple underutilized computer systems with virtual machines that run on a single physical system. This migration from real physical machines to virtual machines reduces operating expenses for power and cooling. Other areas where this technology is applicable are development, testing and demo environments. By decoupling the guest OS and applications installed in the guest OS from physical hardware, virtualization allows for the quick deployment of OS instances and applications on existing host systems without requiring the procurement of a new physical system.

Virtualization technologies emerged in the late 1960s and 1970s and virtualization systems for modern hardware architectures have been available since the late 1990s as shown in U.S. Pat. No. 6,397,242 to Bugnion et al., May 28, 2002.

With increasing hardware performance of affordable desktop and laptop systems, the rapidly declining price/capacity ratio of external storage devices, and the free or low-cost availability of VMMs from vendors like Microsoft Inc. or VMWare Inc. these technologies can now be combined to facilitate the concept of a portable virtual machine. A virtual hard disk image that contains an installed OS can be stored on an external storage device, such as a USB flash memory drive, compact flash card, mini hard disk drive, portable music player, or a cell phone with embedded storage. This enables a personal portable 'computer in a pocket' that provides persistent storage of an OS, applications, user settings and user data. (Persistent storage means that data is not lost when the system is shut down).

Various solutions for portable computing environments have been proposed. One approach is sold under the trademark Mojopac from RingCube Technologies Inc. of Santa Clara, Calif. Mojopac is not based on full virtualization as described above but rather simulates isolated instances of OS services as for example the registry in Microsoft Windows. The drawback of the approach taken by RingCube is that it is inherently OS specific. The applications installed on a portable device are not portable across different host operating systems.

Another approach to providing a portable computing environment is trademarked Moka5 from Moka5 of Palo Alto, Calif. Moka5 uses hardware virtualization and incorporates a customized VMM from VMware Inc. Other VMMs are not supported. The disadvantage of this solution is that I/O read and write operations from the portable OS directly access a virtual hard disk stored on a portable storage device or a network repository (U.S. patent application Ser. No. 11/428, 008 to Monica Sin-Ling Lam et al., Jun. 30, 2006). For maximum portability a small form factor of the portable storage device is highly desirable. Consumer grade flash memory devices offer the smallest form factor but only support significantly lower write speeds than internal storage (The term internal storage refers to storage mediums that are attached internally to a computer system, typically through an internal IDE, SATA or SAS bus). Compared to an OS that is installed on a virtual hard disk on internal storage Moka5 delivers low performance. In addition, I/O operations to a network repository depend on the availability and reliability of a network connection, a dependency that is not desirable for a portable solution.

Another I/O related problem that is not addressed by Moka5 is the fact that the number of sustainable erase/write cycles for flash-memory-based devices is limited. Flash memory is non-volatile computer memory. Storage blocks are electrically erased and reprogrammed with every write operation to the flash memory device. The number of erase/write cycles each data block can sustain is limited. An entire storage device can become unusable because a few blocks that are accessed very frequently, have reached their erase/write cycle limit. If an OS writes directly to a virtual hard disk that is stored on a flash-memory-based device, the lifetime of the storage device is negatively impacted since the OS accesses the virtual hard disk very frequently.

To mitigate the problem of flash memory 'wearing out' the concept of 'Wear Levelling' was introduced. For consumer grade flash memory devices 'Wear Levelling' is implemented in the firmware of the devices' flash memory controller. The method tries to distribute data written to flash-based-memory evenly across all available data blocks on the storage device. The goal is to avoid the situation described above where storage blocks that are erased and re-written frequently fail and render the entire device unusable before the less used data blocks have reached the end of their lifetime.

Several wear levelling algorithms have been proposed, for example in U.S. Pat. No. 5,568,423 to Jou et al., Oct. 22, 1996, and U.S. Pat. No. 5,341,339 to Wells, Aug. 23, 1994. While wear levelling mitigates the problem, the underlying issue remains. Particularly when a high percentage of a device's capacity is in use, write operations can only be balanced across a relatively small number of physical data blocks.

The concept of a 'Portable Personal Computing Environment Server' is proposed in U.S. patent application Ser. No.

11/154,084 to Narayanaswami et al., Jun. 16, 2005 (see also Publications U.S. Ser. No. 10/795,153 and U.S. Ser. No. 11/281,795). The concept is based on bootstrapping an OS from a portable storage device. The personal computing environment is then run in a virtual machine that runs on the OS that was booted from the portable storage device. While this approach allows for saving and restoring the state of the personal computing environment it suffers from the limitation that the host OS needs to be booted from the portable device. This implies that any running OS on the host system needs to be shut down first. The other drawback of this approach is that it requires the adjustment of Basic Input/Output System (BIOS) settings on the system the portable storage drive is connected to (The BIOS is a standard defining a firmware interface for IBM PC compatible computers). Particularly inexperienced users will not feel comfortable making changes to the BIOS, as a configuration mistake can render a system unusable. This approach also suffers from the same disadvantage described in the context of Moka5. The virtual machine as well as the portable host OS directly access the portable storage device. Particularly if flash-memory-base storage is used this results in slow performance and limited longevity of the storage device.

U.S. patent application Ser. No. 11/032,775 to Birrell et al., Jan. 10, 2005 proposes a personal computing environment that is based on a combination of data cached on a portable storage device and data stored on a storage device accessible through a network connection. Such an approach is dependent on the availability, performance and reliability of a network connection.

Another approach to providing a portable computing environment is based on the customization of applications to enable them to execute directly from the portable storage device. An example of this approach is sold under the trademark U3 from U3 LLC of Milpitas, Calif. The main drawback of this solution is that only a relatively small number of modified applications is available. The other drawback is the dependence on a host OS that supports the respective applications.

A feature that enables an OS that is installed on a flash-memory-based device to take advantage of a storage medium with faster I/O performance is called Enhanced Write Filter (EWF) from Microsoft Inc. of Redmond, Wash. EWF is packaged with Microsoft Windows XP Embedded. Windows XP Embedded is a modular version of Windows XP specifically for use in embedded devices such as ATMs, arcade games, slot machines, cash registers, industrial robotics, thin clients, set-top boxes etc. EWF is based on a technique that is referred to as copy-on-write (COW). With COW, write operations to a storage medium are redirected to another storage medium. (The COW technique will be described in more detail below). EWF's COW implementation supports the redirection of write operations to flash-memory-based storage to fast volatile Random Access Memory (RAM) or alternatively a second partition on the storage medium the OS is installed on. Redirecting write I/O operations to a second partition on the same storage device does not address the described problem of lack of performance and longevity of flash-memory-based storage devices. Reliably redirecting write I/O operations to RAM provides performance benefits but requires that the storage capacity available on the storage device is matched by the amount of memory available on the host system. Moreover, running an instance of Windows XP Embedded from a portable flash-memory-based storage device would also require the modification of BIOS settings and shut down of the OS running on the system the device is connected to. The other obvious limitation of EWF is that this method is specific to one version of one OS.

2. Advantages

Accordingly, several advantages of one or more aspects are to provide a method for the efficient and secure launch and operation of an OS instance installed in a virtual hard disk that is stored on a portable storage device. After the portable storage device has been connected to a host system with an installed VMM, the OS instance can be run in a virtual machine. In the following this OS instance will be referred to as the portable OS.

Unlike other solutions that require the installation of a specific VMM on a host system or only support a specific host OS, the proposed method provides flexibility by automatically and dynamically adapting the portable OS installation to hardware that is emulated by the VMM that was autodetected on the host system. Examples of VMMs supported in the first embodiment are VMware Workstation and VMware Player from VMware Inc. of Palo Alto, Calif., Virtual PC from Microsoft Inc. of Redmond, Wash. and VirtualBox Open Source Edition (OSE) from Sun Microsystems Inc. of Mountain View, Calif. through acquisition of Innotek GmbH of Weinstadt, Germany.

Providing the source code for the method is compiled for the respective host OS and packaged with the portable storage device, the portable OS can be launched on a wide range of hardware platforms supported by the respective VMMs, such as Microsoft Windows XP, Microsoft Windows Vista, RedHat Linux, SuSE Linux and Apple MacOS. Supporting a wide range of OS and VMM platforms is crucial for a portable solution. A user may not know in advance what type of system will be available for use with the portable OS. For source code portability the first embodiment was implemented in C++ using the cross-platform development toolkit QT from Nokia Corporation that is supported on Microsoft Windows, Unix/Linux and Apple MacOS.

The described method also optimizes the configuration of the virtual machine running the portable OS for performance, security and stability. Write operations from the portable OS to virtual hard disks are redirected to overlay files on a storage medium that provides better I/O write performance than the portable storage device. Particularly consumer grade, flash-memory-based portable storage devices show poor write I/O performance as compared to internal storage. With the proposed configuration slow write I/O performance of the portable storage device does not adversely affect run time performance of the guest OS. It is important to note that read performance of flash-memory-based storage devices is significantly higher than write performance and therefore has a much lesser effect on virtual machine performance.

After the portable OS has been shut down, data that was written to overlay files at run time can be merged with the virtual hard disks on the portable storage device if the respective data is not to be lost.

Another benefit of the described method is increased longevity of the portable storage device, particularly for devices that use flash-memory. Storage blocks in flash-memory can only sustain a limited number of erase/write cycles (http://en.wikipedia.org/wiki/Flash memory, Mar. 10, 2009). The amount of write operations to the external storage device is reduced, as data blocks that have been modified multiple times are only written back to the portable storage device once. As Operating systems frequently access very specific areas of a disk drive the reduction in write operations through consolidated write operations after shut down is very significant.

Other benefits of the described method are superior security and stability as compared to a traditional OS installation to a system's internal storage. User and system data are separated and stored on two different virtual hard disks. For the typical use case where a user accesses user data through an installed application, the first embodiment provides a GUI that allows for enabling the automatic removal of modified system data after shutdown. This means that system changes that are the result of virus infections or unknowingly installed malware can not compromise the system's integrity after shut down. The GUI also provides a configuration option that enables that the user is prompted for feedback regarding the merging of overlay files for system data. This option is provided in case it is not known beforehand if applications will be installed on the virtual hard disk storing system data.

Another benefit of the described method is that it enables a user to create a fixed system installation that includes stable versions of all applications needed. If system changes are deleted after shutdown, the user can rely on a clean installation and the exact version of the respective applications whenever the system is started. As user data is stored on a separate virtual hard disk, system changes can be discarded while user data remains persistent. This is an important factor as some applications update themselves automatically to newer versions that are sometimes less stable than the versions that they are replacing.

The described method also maximizes usable virtual hard disk space on the portable storage device through a specific OS configuration for the management of page file data. Page files are used by modern operating systems to temporarily store data that cannot be accommodated by physical memory. Page files are created and expanded by the OS as needed. Page data is transient and does not need to be permanently stored by the OS. The described method uses a separate, dynamically expanding virtual hard disk for storing paging data. At startup time this virtual hard disk does not contain any data and only one 'empty' virtual hard disk per supported VMM type needs to be stored on the portable storage device. This method significantly increases the amount of virtual hard disk space available for the portable OS on the external storage device.

Further advantages of various aspects will become apparent from a consideration of the ensuing description and drawings.

SUMMARY

In accordance with one embodiment, a set of programs are provided that enable the fast, secure and efficient operation of a portable OS in a virtual machine. The portable OS is installed on a virtual hard disk that is stored on a portable storage device, for example a USB flash memory drive. A second virtual hard disk on the portable storage device stores user data accessed by the portable OS. The set of programs is stored on and executed from the portable storage device after the portable storage device has been connected to a host system. Available resources, including an installed VMM, the amount of available memory (RAM), network connectivity and the storage configuration for user data are autodetected on the host system. The OS installation on the virtual hard disk is adapted to work with the hardware emulated by the autodetected VMM. A suitable location for the creation of a temporary directory is identified in one of the file systems the host system has write access to. A temporary directory is created that accommodates all files related to the virtual machine configuration and operation. After resource autodetection, image adaptation and directory creation, a virtual machine configuration file is dynamically created for the respective VMM. The configuration is based on user settings and resource availability on the host system and references the virtual hard disks that are stored on the external storage device. The virtual hard disks for user and system data are configured as copy-on-write (COW) disks, redirecting write operations to virtual hard disks to overlay files in the temporary directory. A third non-persistent virtual hard disk in the temporary directory is configured to host paging data. Other virtual machine parameters such as screen resolution, the amount of physical memory and network connectivity are configured, depending upon the corresponding parameter values detected on the host system. After shutdown of the virtual machine the virtual hard disk overlay files can be merged with the corresponding virtual hard disks if data persistence is required. After the user indicates that the virtual machine is no longer needed, all files located in the temporary directory on the physical host system are deleted.

DRAWINGS

Figures

FIG. 1 is a prior-art functional block diagram of a physical system hosting one virtual machine through a VMM.

FIG. 2 is a schematic view showing the configuration of the virtual hard disks for system, user and page data, at runtime of the portable virtual machine, including the COW configuration that redirects write operations to overlay files in a file system that resides on a hard disk attached to the host system FIG. 3 is a schematic view illustrating the merging of data blocks stored in virtual hard disk overlay files with the corresponding virtual hard disk base files after shutdown of the virtual machine.

FIG. 4 is a flowchart illustrating a method in which properties of the host system are autodetected FIG. 5 is a flowchart illustrating a method in which a virtual machine configuration is created, the virtual machine is launched and virtual hard disk overlay files are merged after shutdown of the virtual machine.

FIG. 6 is a flowchart illustrating a method in which a command shell that accesses the system image is initialized by opening the system image and reading its partition and file system structure FIG. 7 is a flowchart illustrating a method implemented in the command shell for copying a file from the system image into the host system's file system FIG. 8 is a flowchart illustrating a method implemented in the command shell for copying a file from the host system's file system into the system image FIG. 9 is a flowchart illustrating a method in which the virtual hard disk image storing system data (also referred to as the system image) is modified for use with a VMM type that is different from the VMM type used for the previous virtual machine launch FIG. 10A shows the master boot record configuration used for virtual hard disks in VMware and Microsoft format while FIG. 10B shows same for virtual hard disks in VirtualBox's VDI format.

FIG. 11 is a flowchart illustrating a method in which a virtual machine for is created, modified, and launched with the VirtualBox VMM FIG. 12 is a block diagram illustrating the virtual hard disk configuration at runtime for fixed sized, independent, non-persistent virtual hard disks (VMware terminology) stored in VMware's virtual disk format.

FIG. 13 is a prior-art block diagram of the hosted sparse extent configuration used for VMware virtual hard disk overlay files according to version 1.0 of VMWare's Virtual Disk Format specification FIG. 14 shows a flowchart illustrating a method in which a virtual hard disk overlay file is merged with a corresponding virtual hard disk base file for a virtual hard disk in VMWare format FIG. 15 is a block diagram illustrating the virtual hard disk configuration at runtime for fixed size, undo hard drives (Microsoft terminology) stored in Microsoft's virtual hard disk format.

GLOSSARY

Figure 1:
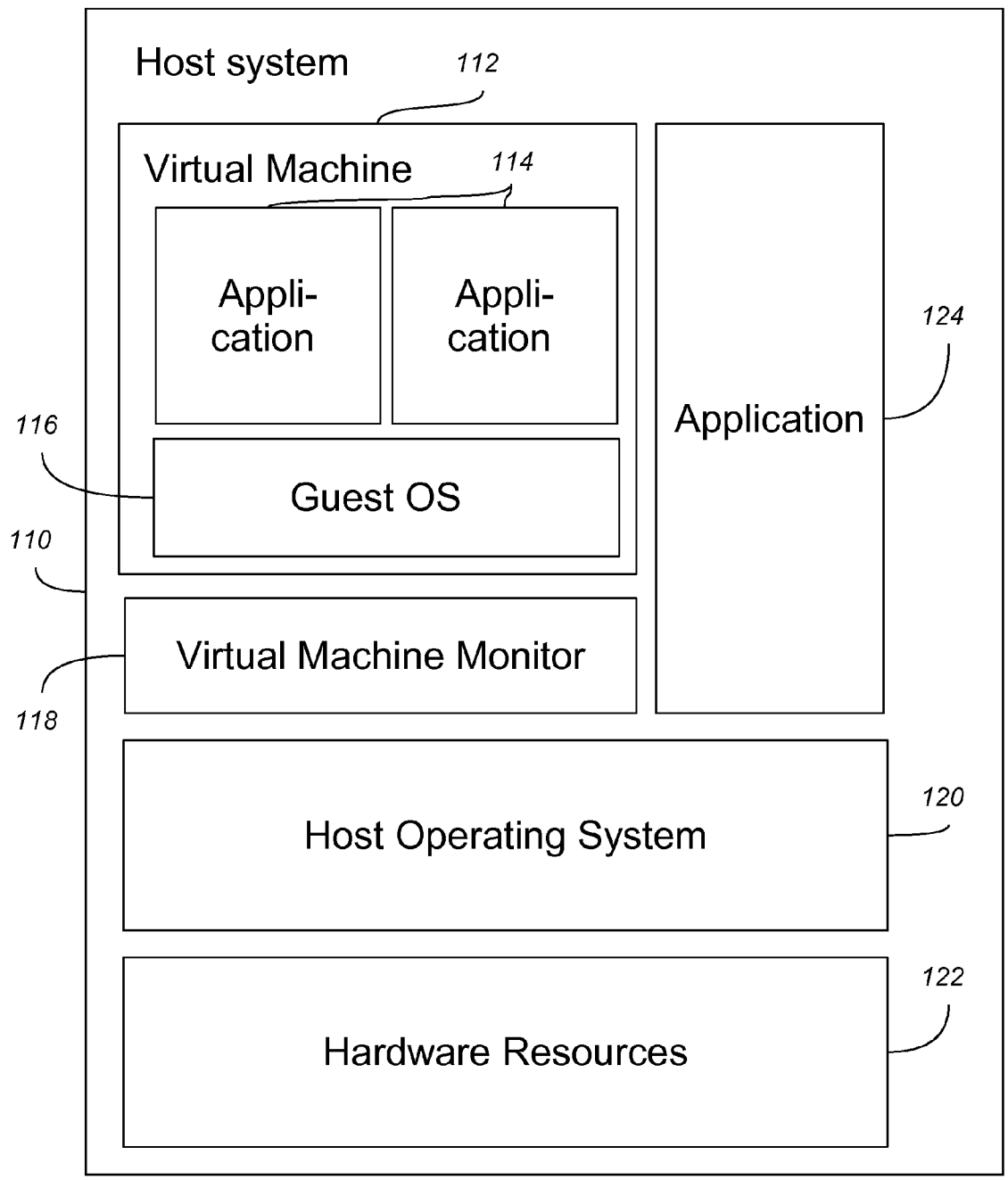

API Application programming interface. A source code interface that an operating system or library provides to support requests for services to be made of it by computer programs (http://en.wikipedia.org/wiki/API, Mar. 10, 2009)

Autodetection The automated probing of a computer system to discover the presence of specific resources and properties such as memory, screen resolution, installed software or space and locality of attached storage devices Bitmap A sequence of bits (binary values containing 0 or 1)

BAT Block Allocation Table A table referencing data blocks in a virtual hard disk overlay file. The BAT is specific to overlay files in Microsoft's 'Virtual Hard Disk Image Format Specification'. The specification uses the term 'differencing virtual hard disks' instead of virtual hard disk overlay files Cluster The FAT32 file system manages data with the granularity of clusters. A cluster is a contiguous blocks of 4-64 sectors. The cluster size depends on the partition size.

Command Shell A piece of software that provides a command line interface for users for accessing system services for example for file copy operations or the creation of a directory. Command shells can also execute sequences of commands stored in files, referred to as (shell) scripts.

Cookie In the context of this document a cookie is a string with fixed content identifying the virtual hard disk file format. Typically the term is used in the context of web infrastructures where cookies are parcels of text sent by a server to a web browser and then sent back unchanged by the browser each time it accesses that server. Cookies are used for authenticating, tracking, and maintaining specific information about users, such as site preferences or the contents of their electronic shopping carts (http://en.wikipedia.org/wiki/HTTP_cookie, Mar. 10, 2009).

COW (Copy-On-Write) In the context of this document copy-on-write (COW) is a method for redirecting virtual hard disk write operations to a virtual hard disk overlay file. The first write access to a data block after the start of a virtual machine triggers a copy operation of the respective block from the virtual hard disk to memory. The VMM then executes a write operation that modifies the in-memory copy of the data block. Next, the modified block is written to the overlay file by the VMM. The overlay file expands dynamically. Write operations to blocks that have already been copied are only executed on the virtual hard disk overlay file. Read operations to data blocks containing modified data are performed on the overlay file. In the context of this document the term virtual hard disk base file is used for the virtual hard disk that contains unmodified data.

CPU A Central Processing Unit (CPU) is an electronic circuit that can execute computer programs.

Device driver A device driver is a program allowing higher-level programs to interact with a hardware device (http://en.wikipedia.org/wiki/Device_driver, Mar. 10, 2009) Differencing disks Virtual hard disk overlay files used in Microsoft's 'Virtual Hard Disk Image Format Specification'

Directory Entity in a file system that contains a group of files and/or other directories Environment Variable Environment variables are a set of dynamic values that can affect the way running program will behave on a computer.

External Storage Storage media attached to a system through an external port, such as a USB port, without direct connectivity to hard disk controllers. Disks connected through external IDE/SAS or SATA ports are not considered external storage in this context and are typically only found on industry grade servers.

Erase-Write cycle Write operations to flash-memory-based storage devices always erase a data block before rewriting it with modified data. Every write operation entails at least one erase-write cycle to the flash based memory device.

EXT2, EXT3 Linux file systems

Extent A file that stores virtual hard disk data in VMware's 'Virtual Disk Format'

FAT (File Allocation Table) A file system developed by Microsoft for MS-DOS. FAT32 is a later implementation of FAT allowing larger file and storage partition sizes than earlier FAT implementations.

File Pointer A file pointer is an offset value that references a location in a file that was previously opened. It specifies the next byte to be read or the location to receive the next byte written.

File System A method for storing and organizing computer files and the data they contain on a storage medium so that they can be accessed quickly and easily by an operating system.

Flash Memory Non-volatile computer memory that can be electrically erased and reprogrammed. It is a technology that is primarily used in memory cards and USB flash drives (thumb drives, handy drive, memory stick, flash stick, jump drive) for general storage and transfer of data between computers and other digital products (http://en.wikipedia.org/wiki/Flash_memory)

Guest OS An operating system running in a virtual machine

GUI Graphical User Interface A user interface that allows a user to interact with an application or operating system. It presents graphical icons, visual indicators or special graphical elements called 'widgets'. Often the icons are used in conjunction with text, labels or text navigation to fully represent the information and actions available to a user. But instead of offering only text menus, or requiring typed commands, the actions are usually performed through direct manipulation of the graphical elements (http://en.wikipedia.org/wiki/GUI, Mar. 10, 2009)

Host Computer A computer running a host OS

Host OS An operating system running on a physical host that executes a VMM

I/O Operation An Input/Output or read or write operation to or from a storage device.

IDE Integrated Drive Electronics A standard interface for connecting storage devices such as hard disks, solid state disks and CD-ROM drives inside personal computers (http://en.wikipedia.org/wiki/Integrated_Drive_Electronics, Mar. 10, 2009)

Immutable virtual hard disk VirtualBox terminology for a virtual hard disk configured to use COW Internal Storage The term internal storage refers to storage mediums that are attached internally to a computer system, typically through an internal IDE, SATA or SAS bus. Typical storage mediums for internal storage are hard disk drives or solid state drives.

Independent nonpersistent virtual hard disk VMware terminology for a virtual hard disk configured to use COW Locally attached storage See internal storage MAC Address A quasi-unique ID that is assigned to a network device by the manufacturer MBR Master Boot Record A 512 byte (one sector) long structure comprising boot code and the partition layout on a disk drive Metadata Data about the organizational structure of data Mount Point A directory in a file system to which a partition or other storage device is logically attached NAT Network Address Translation modifies network address information in datagram packet headers handled by a routing device in order to remap one IP address space into another.

NULL pointer A zero entry in a reference table. A Null pointer typically indicates an invalid reference.

Off-line Registry Editor A tool for modifying Microsoft Windows registry entries while the OS is not running Operating System An operating system (OS) is the software that manages the sharing of the resources of a computer and provides programmers with an interface used to access those resources http://en.wikipedia.org/wiki/Operating_system, Mar. 10, 2009). Examples of operating systems are Linux, Microsoft Windows or Mac OS X.

Paging Paging is an important part of the virtual memory implementation in most contemporary general-purpose operating systems. Paging allows the OS to easily use disk storage for data that does not fit into physical memory (RAM) (http://en.wikipedia.org/wiki/Page_file, Mar. 10, 2009). Microsoft Windows stores paging data in a page file.

Page File The page file is a typically large, dynamically growing file in the file system of an OS that contains paging data.

Paging data Data that does not fit into a system's physical memory and is written to disk Partition A partition is a contiguous section of blocks on a physical hard disk. Each section represents a logical disk. Each partition is formatted with a file system.

PCI/PCI-X/PCI-E Computer bus architectures for attaching hardware devices in a computer Persistence Persistent data is data that was stored by a running OS and is available after the OS has been restarted. Data that is lost with the shutdown of an OS is referred to as non-persistent.

RAM Random Access Memory A volatile computer data storage.

Registry A database in Microsoft Windows that stores system settings, hardware and driver configurations, application information and user preferences.

Root Drive Letter The highest level in the directory hierarchy of a storage volume. On Microsoft Windows based systems the respective drive letter followed by a colon and backslash e.g. C:\

SAS Serial Attached SCSI is a computer bus architecture designed for data transfer to and from storage devices and hard drives SATA Serial ATA is an interface for connecting mass storage devices Script A sequence of commands to be executed by a command shell.

Sector The basic unit of data storage on a hard disk. A sector contains 512 bytes.

System Call The mechanism used by an application program to request service from the operating system (http://en.wikipedia.org/wiki/System_call, Mar. 10, 2009)

Thread Flow of program execution

UNC The Uniform Naming Convention (UNC) describes the location of a network resource such as network storage Undo virtual hard disk Microsoft terminology for a virtual hard disk configured to use COW VDI (Virtual Disk Image) The virtual hard disk format used by Sun VirtualBox Virtual Hard Disk A virtual hard disk is the emulation of a physical hard disk by a VMM. The virtual hard disk is accessed by a virtual machine. From the perspective of the guest OS running in the virtual machine the virtual hard disk looks like a physical hard disk. From the perspective of the host system, a virtual hard disk is a large file in its native file system. The data stored in this file is organized analogous to the way data is organized on a physical hard drive.

Virtual Hard Disk Base File With a COW virtual hard disk configuration write operations to a virtual hard disk become write operations to the virtual hard disk overlay file (see also COW). The unmodified content of the virtual hard disk file is referred to as the virtual hard disk base file.

Virtual Hard Disk Image A disk image is a computer file that contains the complete content and structure of a hard drive. A virtual hard disk image is a disk image that is encapsulated in a virtual hard disk format.

Virtual Hard Disk Overlay File With a COW virtual hard disk configuration write operations to a virtual hard disk become write operations to the virtual hard disk overlay file (see also COW).

Virtual Machine A virtual machine is a software implementation of a computer that executes programs like a real physical computer system.

VMM (Virtual Machine Monitor) A program that runs on a host system and emulates a physical computer system, facilitating the operation of one or more virtual machines.

Wear Levelling A technique for prolonging the service life of some kinds of erasable computer storage media, such as flash memory (http://en.wikipedia.org/wiki/Wear_levelling, Mar. 10, 2009)

Windows registry—A centralized hierarchical database that stores system settings, hardware, and driver configurations, application information and user preferences.

WPA file The Windows Product Activation (WPA) is a file specific to Microsoft Windows XP. It stores information about the hardware the OS was installed on. If the disk containing the installation is moved to a different computer system, the product activation is invalidated. In this case the user will not be able to log into the system.

DETAILED DESCRIPTION

FIG. 1

Prior-Art—Block Diagram of Virtualization Concepts

FIG. 1 is a prior-art block diagram that illustrates the basic concepts of hosted virtualization. The diagram is derived from FIG. 1 in the 'Introduction' section of the article "Virtualizing I/O Devices on VMware Workstation's Hosted Virtual Machine Monitor" by Sugerman et al. from the Proceedings of the 2001 USENIX Annual Technical Conference Boston, Jun. 25, 2001-Jun. 30, 2001.

A host system 110 runs a general purpose operating system 120 that manages access of one or more applications 124 to hardware resources 122. A VMM 118 runs on the host system, emulating the hardware of a physical system. From the perspective of host operating system 120, VMM 118 is an application. Virtual machine 112 runs a guest OS 116 in an environment that is isolated from the host OS. Guest OS 116 hosts its own set of applications 114 and is installed on a virtual hard disk (not shown in FIG. 1). A virtual hard disk is implemented as a (typically very large) file that is stored on a file system accessible to the host. From the perspective of the guest OS, a virtual hard disk cannot be distinguished from a physical storage volume. The virtual hard disk stores a system image containing the complete content and structure of a physical hard disk. Multiple virtual hard disks containing disk images can be attached to a virtual machine just as multiple physical hard disks can be attached to a physical system.

FIG. 2

Optimized Virtual Hard Disk Configuration of Virtual Machine

Figure 2:
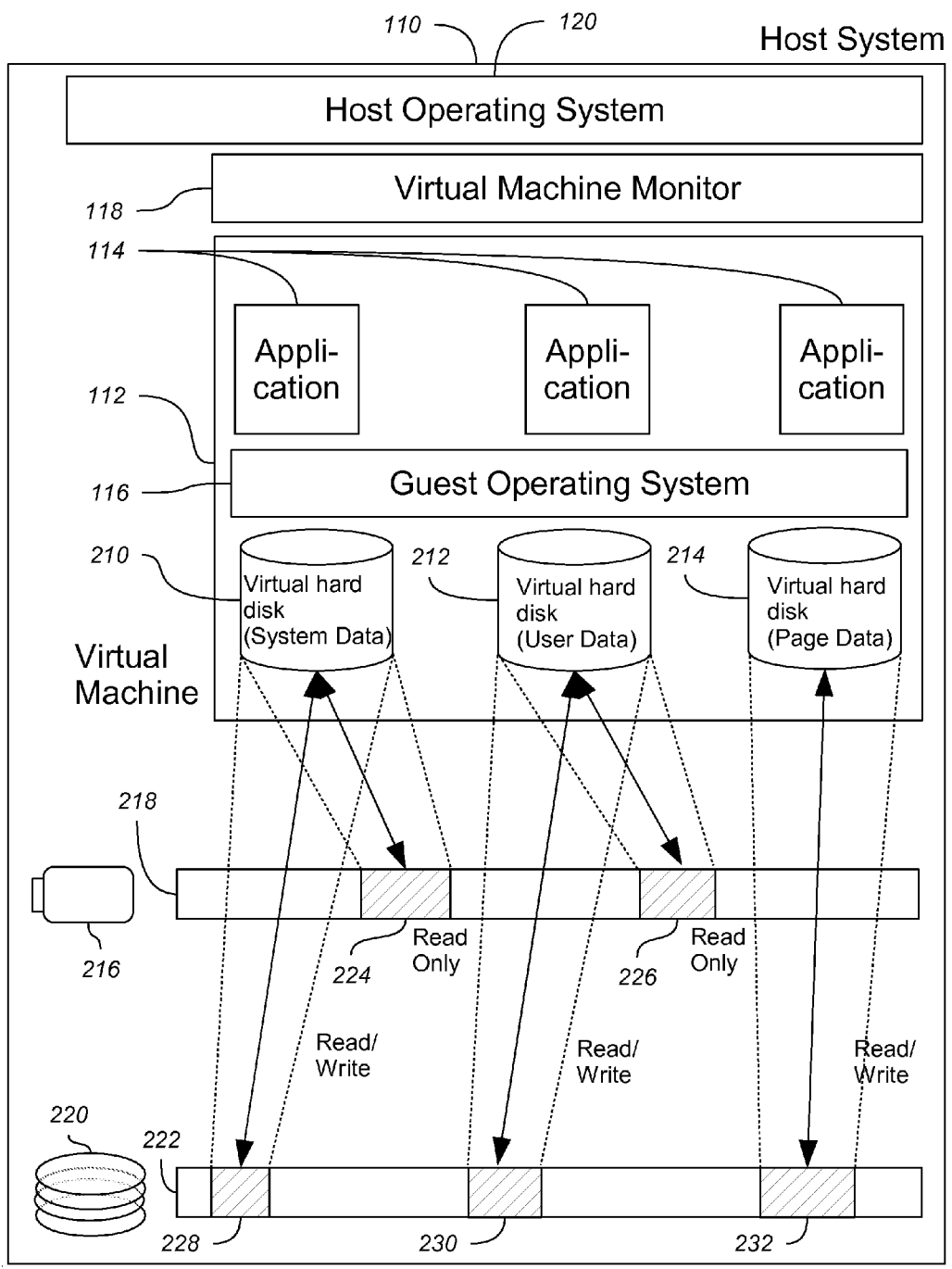

FIG. 2 shows the virtual hard disk configuration for virtual machine 112. The first embodiment that is described in the following runs a Microsoft Windows XP guest OS on a host system that runs Microsoft Windows XP or Microsoft Windows Vista and one of the following VMM types: VMware Workstation, VMware Player, Microsoft Virtual PC and Sun VirtualBox Open Source Edition (OSE). The external storage device is a flash-memory-based storage device. Alternative embodiments will be described below.

Virtual machine 112 running guest OS 116 is configured to use three virtual hard disks. Virtual hard disk 210 is used for system data and stores the guest OS and installed applications. Virtual hard disk 212 is used for user data such as documents, images or audio files. Virtual hard disk 214 is used for paging data. All virtual hard disks are formatted with Microsoft's FAT32 file system. In the following the term 'system image' will also be used for the file representing virtual hard disk 210.

The directory structure for user data on virtual hard disk 212 is the directory structure that was located on the system image after OS installation. This directory structure was moved from the system image to the virtual hard disk storing user data. The separation of user and system data is accomplished by modifying Windows registry settings in guest OS 116. Windows registry values corresponding to user data directories are set to refer to the respective directory on virtual hard disk 212.

One example is the registry key 'HKCU\Software\Microsoft\Windows\CurrentVersion\Explorer\Shell Folders\Personal', that is set to '<drive_letter_user_data>\Documents and Settings\<owner name>\My Documents' in the guest system. ('drive_letter_user_data' is the drive letter the virtual machine assigns to the corresponding virtual hard disk 212).

With this configuration, shortcuts referring to 'My Documents' refer to the corresponding 'My Documents' directory on the virtual hard disk storing user data 212.

The virtual machine is configured to use the COW method for accessing the virtual hard disks for system and user data 210 and 212. COW for virtual hard disks is a feature that all common VMMs provide. The described method dynamically configures this feature for the VMM that was autodetected on the host. With COW configured, at runtime each virtual hard disk consists of two virtual hard disk files: 1. Virtual hard disk base file 224 (or 226) that is accessed by the VMM in read-only mode. 2. The virtual hard disk overlay file 228 (or 230) that contains data blocks that have been modified through write operations to the corresponding virtual hard disk. The overlay file is accessed by the VMM in read-write mode.

When a data block on a virtual hard disk is written to for the first time after the start of the virtual machine, a copy operation to memory is triggered by the VMM. This copy operation copies the accessed block of data from the virtual hard disk base file 224 (or 226) into memory. The VMM then executes a write operation that modifies the in-memory copy of the data block. Next, the modified block is written to overlay file 228 (or 230) by the VMM. The virtual hard disk overlay file expands dynamically. Through this mechanism all changes to the virtual hard disk are captured in the overlay file while the base file remains unmodified. Write operations to blocks that have already been copied are executed only on the virtual hard disk overlay file. Read operations to data blocks containing modified data are also performed on the overlay file. Virtual hard disk images become the virtual hard disk base files 224 (or 226) after the virtual machine has been started. The virtual hard disk images are stored on the external storage device 216.

COW is entirely handled by the VMM and is completely transparent to the virtual machine that only 'sees' three hard disks that it performs I/O operations on: one disk for system, one disk for user and one disk for paging data.

The launch and configuration program dynamically configures the virtual machine to place virtual hard disk overlay files 228 and 230 in a temporary directory. The temporary directory is created automatically in a location in the file system that is identified in an autodetection process. As described in more detail below, the autodetection process tries to create the temporary directory in file system 222 on an internal storage medium 220. Redirecting write operations to a temporary directory on an internal storage medium significantly improves the performance of the virtual machine. All virtual machine related files that are created in the configuration process or by the VMM at runtime are stored in the temporary directory.

The virtual hard disks for user and system data are created before the installation of the portable OS as pre-allocated virtual hard disks of fixed size. With the exception of VMM specific headers and footers, these virtual hard disk files store data in a format that is readable by all VMM types.

Before the start of the virtual machine, an empty, dynamically expanding virtual hard disk 232 is copied from external storage device 216 into the temporary directory. The virtual machine is configured to attach this virtual hard disk for storing paging data. The guest OS 116 is configured to use a dedicated storage volume for storing paging data. Paging data is only generated and accessed at runtime and does not have to be persistent. The dynamically expanding virtual hard disk is deleted after shutdown of the virtual machine. With this configuration no space on the external storage device is wasted for transient OS data.

FIG. 3

Merging of Virtual Hard Disk Overlay Files with Virtual Hard Disk Base Files

Figure 3:
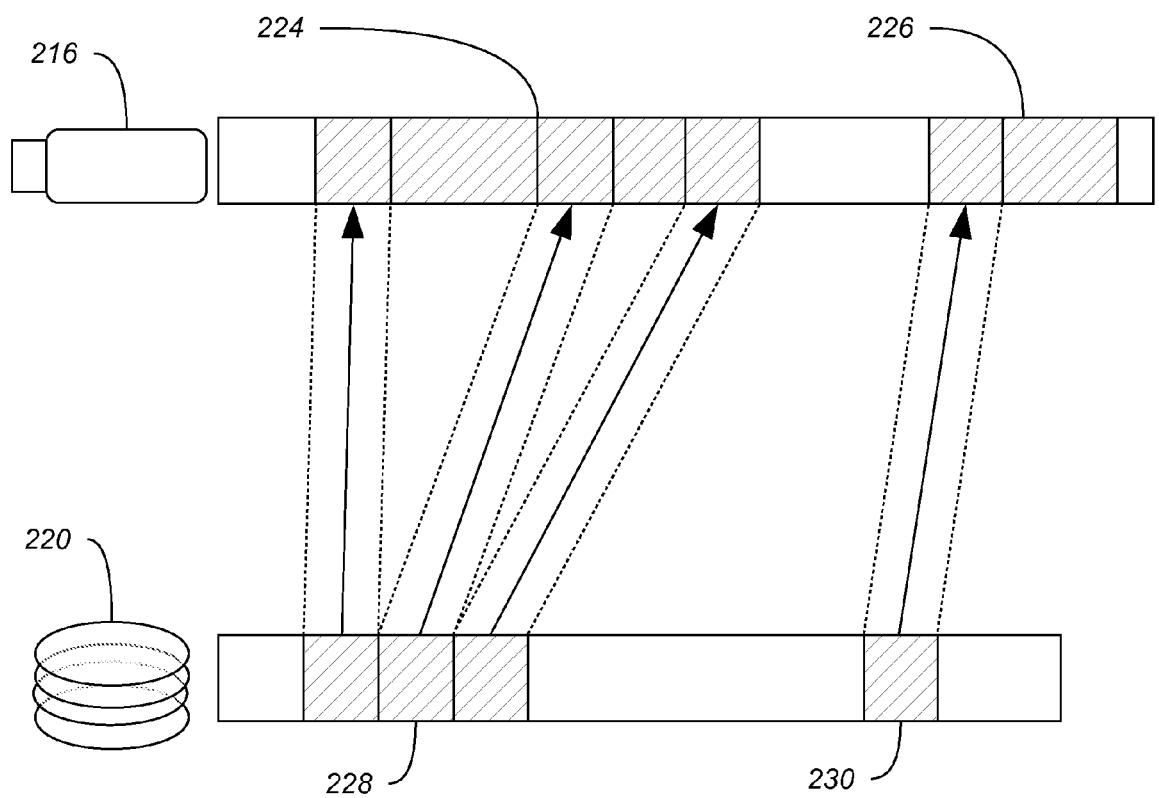

FIG. 3 illustrates how data persistence for the virtual hard disk storing system and user data is achieved. The virtual hard disk overlay files are merged into the corresponding virtual hard disk base files after shutdown of the virtual machine.

By default all VMMs delete the virtual hard disk overlay files after shutdown of the virtual machine. To prevent the deletion of the overlay files by Microsoft and VMware VMMs, the file access permissions of virtual hard disk overlay files 228 and 230 need to be modified. This is accomplished through a separate flow of execution spawned by the launch program after startup of the virtual machine. This flow of execution is also referred to as a background thread. The background thread is launched at startup of the virtual machine and sets the file access permissions for virtual hard disk overlay files 228 and 230 to 'read-only'. After this modification the VMMs cannot delete the overlay files after the virtual machine was shut down. For Sun VirtualBox a modification to one line in the source code was applied to prevent the deletion of overlay files after virtual machine shutdown.

Depending on configuration settings and possibly user feedback (see section 'OPERATION—EMBODIMENT') overlay files 228 and/or 230 are merged with the corresponding virtual hard disks 224 and/or 226 after shutdown of the virtual machine. As will be discussed in more detail below, each virtual hard disk overlay file contains the information required for mapping data blocks in the overlay file with corresponding data blocks in the virtual hard disk base file. In the merge process, unmodified data blocks in the virtual hard disk base file are overwritten with the corresponding modified data blocks in the overlay file.

FIG. 4

Autodetection Flow

Figure 4:
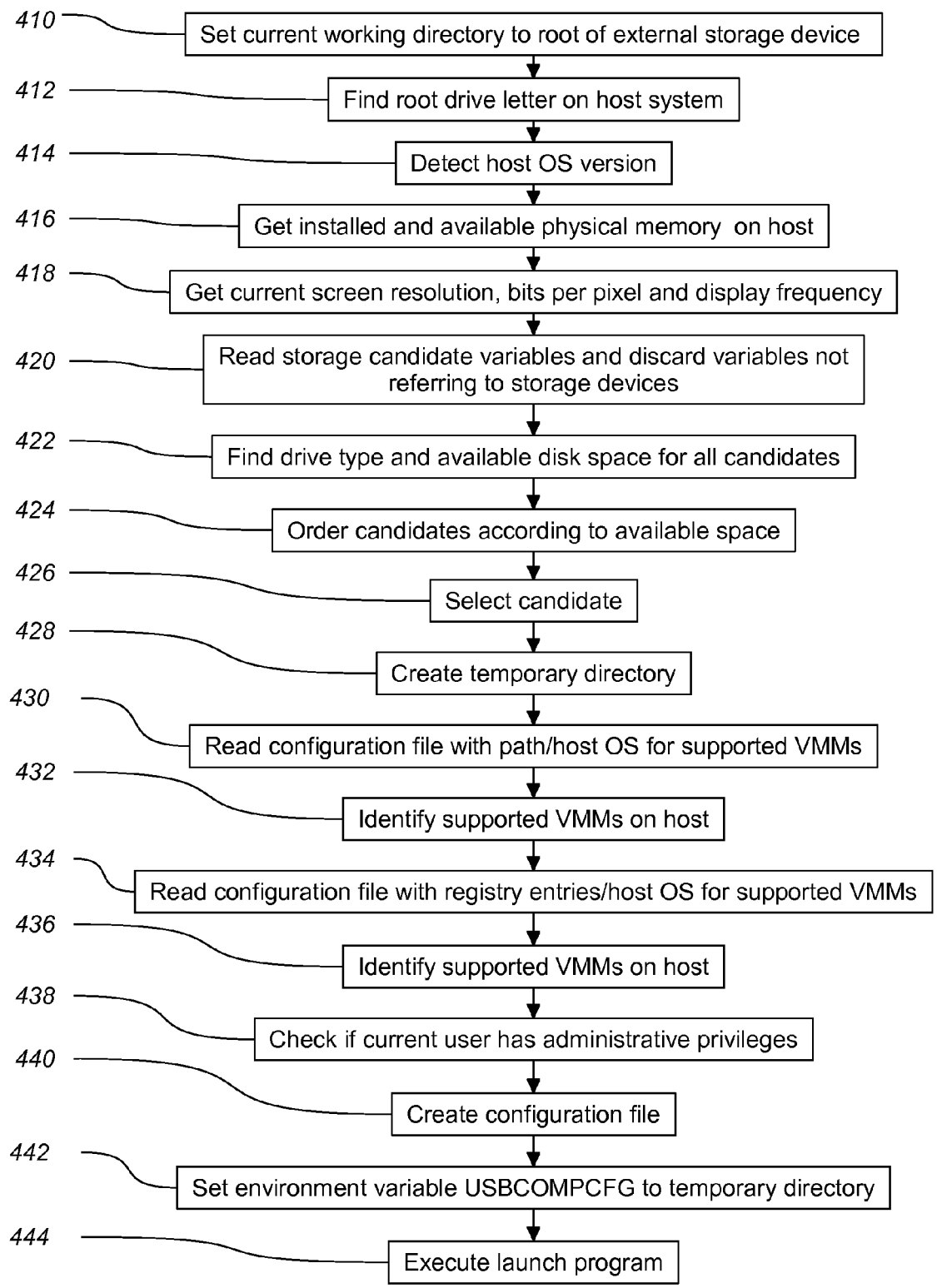

FIG. 4 shows the flow of the autodetection program. The autodetection program is the first program started and automatically executes the other programs for virtual machine configuration and launch. The autodetection program is executed on the host system. It identifies an installed VMM and checks the availability of relevant system resources on the host system.

First the current working directory of the autodetection program is set to the root directory of the external storage device (block 410). The root drive letter on the host system is determined through the corresponding environment variable named 'SYSTEMDRIVE' set by the host OS in block 412. In the following, environment variables will always be referred to using capitals only as they are typically displayed in this format by the OS.

In block 414 the host OS version is determined through a system call. After the OS version has been determined, the amount of installed and available physical memory is determined (block 416). This information is used by the launch program to suggest the amount of memory that should be used for the virtual machine. The current screen resolution, bits per pixel, and display frequency are determined in block 418. This information is used by the launch program to ensure that the virtual machine uses the same resolution and color depth settings currently configured on the host system.

In the next steps (blocks 420-426), the autodetection program determines a location for a temporary directory in which all files related to the launch and execution of the portable virtual machine will be created. In the following this directory will be referred to as 'the temporary directory'. The goal of the implemented algorithm is to find a directory that provides sufficient space and is internally attached to the host system. Internal storage is preferred for the temporary directory as it typically provides better read/write I/O performance than external storage devices. A set of environment variables (in the common embodiment, the variables TMP, TEMP, USERPROFILE) and the drive letter of the host's system drive are considered. In the following, these environment variables will be referred to as 'storage candidates'.

The storage candidates are evaluated to determine whether they are referring to locations in a file system (block 420). Variable settings that neither begin with a drive letter nor follow the Universal Naming Convention (UNC) format are discarded (UNC is a format that describes the location of a network resource).

Next the available disk space and the locality (network v. internal storage) are determined for all storage candidates (block 422). Then the storage candidates are sorted by the amount of available space in the respective directory (block 424). In block 426 the best storage candidate is identified by traversing the sorted list created in block 424, starting with the candidate referring to storage with the largest amount of free space. The first storage candidate that provides internal storage with more than a given minimum amount of free storage space (a limit of 1 GB in the first embodiment), is selected for the creation of the temporary directory. If a storage candidate with a capacity exceeding the given threshold could not be found, a second iteration traverses the sorted list again looking for storage candidates on a network drive that provide more than the minimum amount of available disk space. If no storage candidate could be identified up to this point, the storage candidate on the top of the list, which references storage with the most available space, is selected. The automatic selection can be changed by the user in the launch program's 'Advanced Configuration' GUI. If the location of the temporary directory is changed all data is migrated to the newly selected temporary directory, erasing the original temporary directory.

After determining a location for the temporary directory, the temporary directory is created with a unique name that includes a random number (block 428). Using a uniquely named temporary directory for all files related to the virtual machine allows for the easy deletion of these files if they are no longer needed. In the following the term 'temporary directory' will be used to denote this uniquely named directory.

Once the temporary directory has been created, the autodetection program searches the host system for supported VMMs (block 430). A configuration file is read that contains the following entries for each supported VMM type: An identifier for the VMM type and the supported host OS, and the default installation path to the corresponding VMM executable. All VMM entries where path and supported OS can be matched on the host system are identified (block 432). The VMM type identified first becomes the default VMM type to be used for the launch of the portable virtual machine. The VMM type to be used can be changed later in the advanced configuration GUI of the launch program to any of the VMM types that were autodetected on the host. In the following, the term 'selected VMM', refers to the autodetected VMM that has been selected for the virtual machine launch, either through the default setting or explicit user selection.

Next, the autodetection program reads a second configuration file (block 434). This file is similar in structure to the configuration file that contains the default locations of the VMM executables. Instead of directory locations this file lists registry entries that refer to installation paths for the supported VMM types. This additional method for identifying an installed VMM allows for capturing VMMs that are not installed in their respective default locations. The autodetection program verifies the validity of the locations referenced by the registry entries (block 436), excluding VMMs already detected in block 432.

Next the autodetection program determines if the current user has administrative privileges (block 438). Administrative privileges are not required for the operation of the virtual machine. However, in case no VMM has been detected on the host system, administrative privileges are required to install a VMM from the external storage device.

After the parameters have been detected, a configuration file is created that contains all autodetected settings (block 440). The file is written to the temporary directory created in block 428. The environment variable USBCOMPCFG is set to the path of the temporary directory (block 442) and the launch program is executed (block 444) by means of the 'execl' system call. Execl overlays the calling autodetection process with the launch program. The USBCOMPCFG environment variable set in block 442 remains accessible to the launch program.

FIG. 5

Launch Flow

Figure 5:
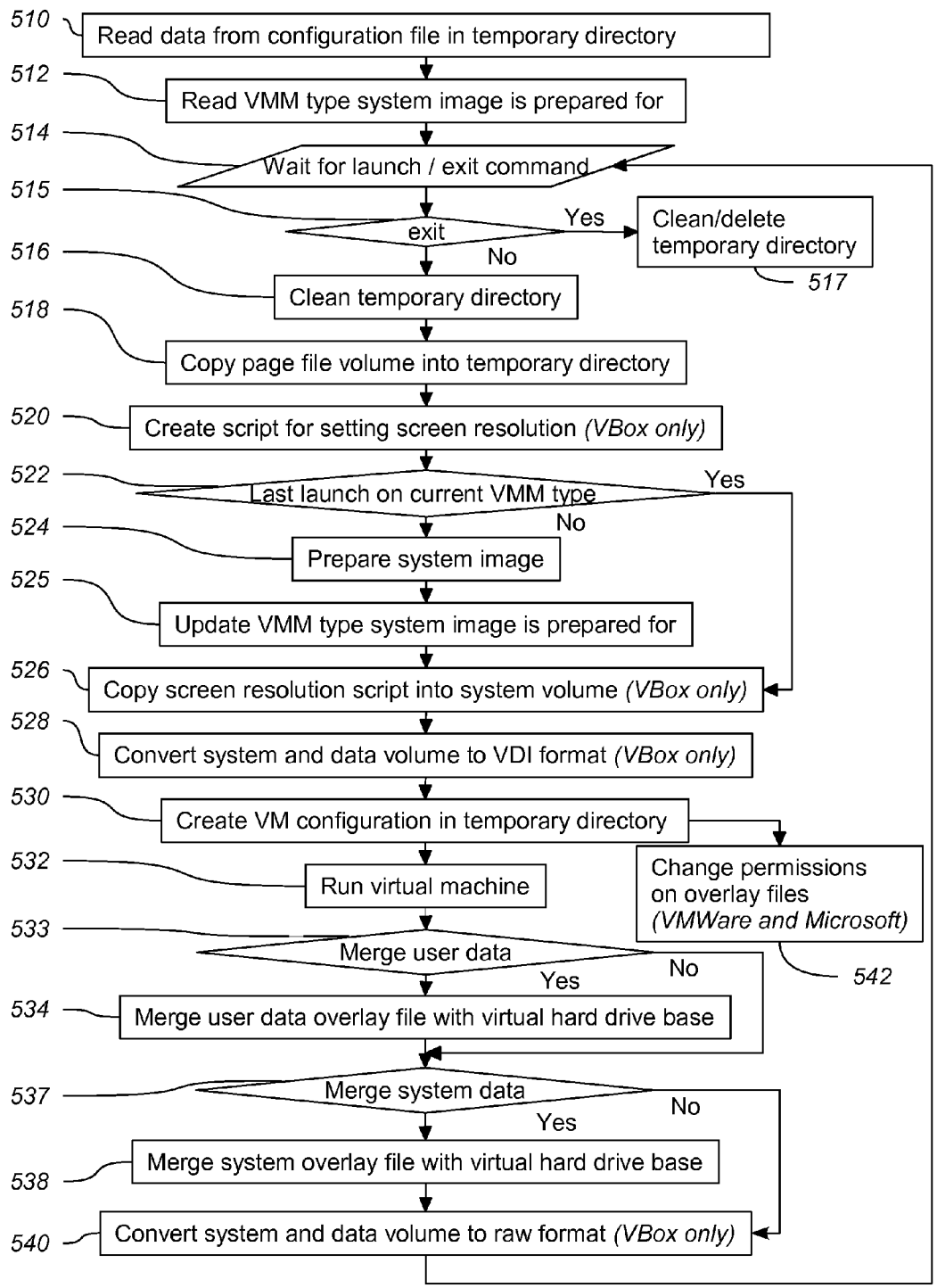

FIG. 5 illustrates the flow of the launch program. The launch program reads the configuration file (block 510) that was generated in the autodetection process in block 440.

In block 512 a string that indicates which VMM type the portable OS image has been running on last is read from a file stored on the external storage device. The image preparation process is described in more detail below.

A GUI is displayed that presents a selection of commands to the user for launch, exit, advanced configuration (not shown), backup and restore (not shown), and file copy (not shown) operations (block 514). In case block 515 determines that the exit menu item was selected, the temporary directory and its content are deleted so that no traces of a VMM launch are left on the host system after the launch program is exited. In case the launch menu item is selected, the GUI is hidden and the program cleans the temporary directory in block 516 from possible residual files left from a previous virtual machine launch.

In block 518 the empty, non-persistent and dynamically expanding virtual hard disk for page data 214 is copied from the external storage device into the temporary directory on the host's file system 222.

If the VirtualBox VMM is used, a script file is created (block 520) that is later copied into a folder in the system image to automatically adjust the screen resolution to the current resolution on the host system. A registry entry is set in the system image to ensure that the script is executed at startup time of the virtual machine. This entry is set in the key HKLM\Software\Microsoft\Windows\CurrentVersion\Run. The VMMs from VMware and Microsoft automatically adjust the resolution settings.

The following steps executed in the launch flow, address the problem that different VMM types emulate different hardware components.

The VMMs used in the first embodiment emulate different Integrated Device Electronics (IDE) controllers. The IDE controller is crucial for the operation of a virtual machine as it enables access to virtual hard disks. To enable IDE support across VMMs, drivers for the respective IDE controllers need to be manually copied into the Windows 'drivers' directory (C:\WINDOWS\system32\drivers). Then registry entries can be added that allow IDE controller's Plug-and-Play (PnP) identification to be automatically mapped to one of the IDE device drivers. (See also Microsoft Knowledge Base Article 314082, "You receive a Stop 0x0000009B error after you move the Windows XP system disk to another computer." Revision 3.3, Feb. 3, 2005). After performing these configuration steps manually, the IDE controllers for the emulated hardware are configured automatically at boot time by the OS. This one-time configuration is not implemented in the launch flow and is only mentioned here for the sake of completeness.

Other issues that are related to the emulation of different hardware components by different VMMs are the Windows Product Activation (WPA) and the configuration of mouse drivers. In the described embodiment these issues are addressed by means of an image preparation process that is specific to the selected VMM. For this purpose a separate image preparation program is used. At decision block 522, the VMM, the system image has been prepared for last (read in block 512), is compared to the selected VMM. If the system image has been prepared for a different VMM type than the selected VMM type, the system image needs to be prepared accordingly and the image preparation program is invoked by the launch program in block 524.

The image preparation program makes the necessary VMM specific modifications to the portable system image by means of accessing all files and directories in the FAT32 file system on the system image 'off-line'. (Off-line means, that the virtual machine's file system is accessed while the virtual machine is not running). The image preparation program comprises a command shell and a script file. A command shell is a program that provides a command line interface for users to access system services for example for copying files, changing directories or deleting files. A script file is a file that contains a sequence of commands to be executed by the command shell. The command shell implemented for the image preparation process includes a very small set of commands for accessing and modifying files 'off-line' in the system image's FAT32 file system. Commands are provided for removing files, changing directories, copying files from the host's file system to the system image, copying files from the system image to the host's file system and for the off-line modification of the Window's registry. The control of the image preparation process through scripts provides flexibility in case the process needs to be modified to accommodate additional VMM types or guest OS'.

Figure 6:
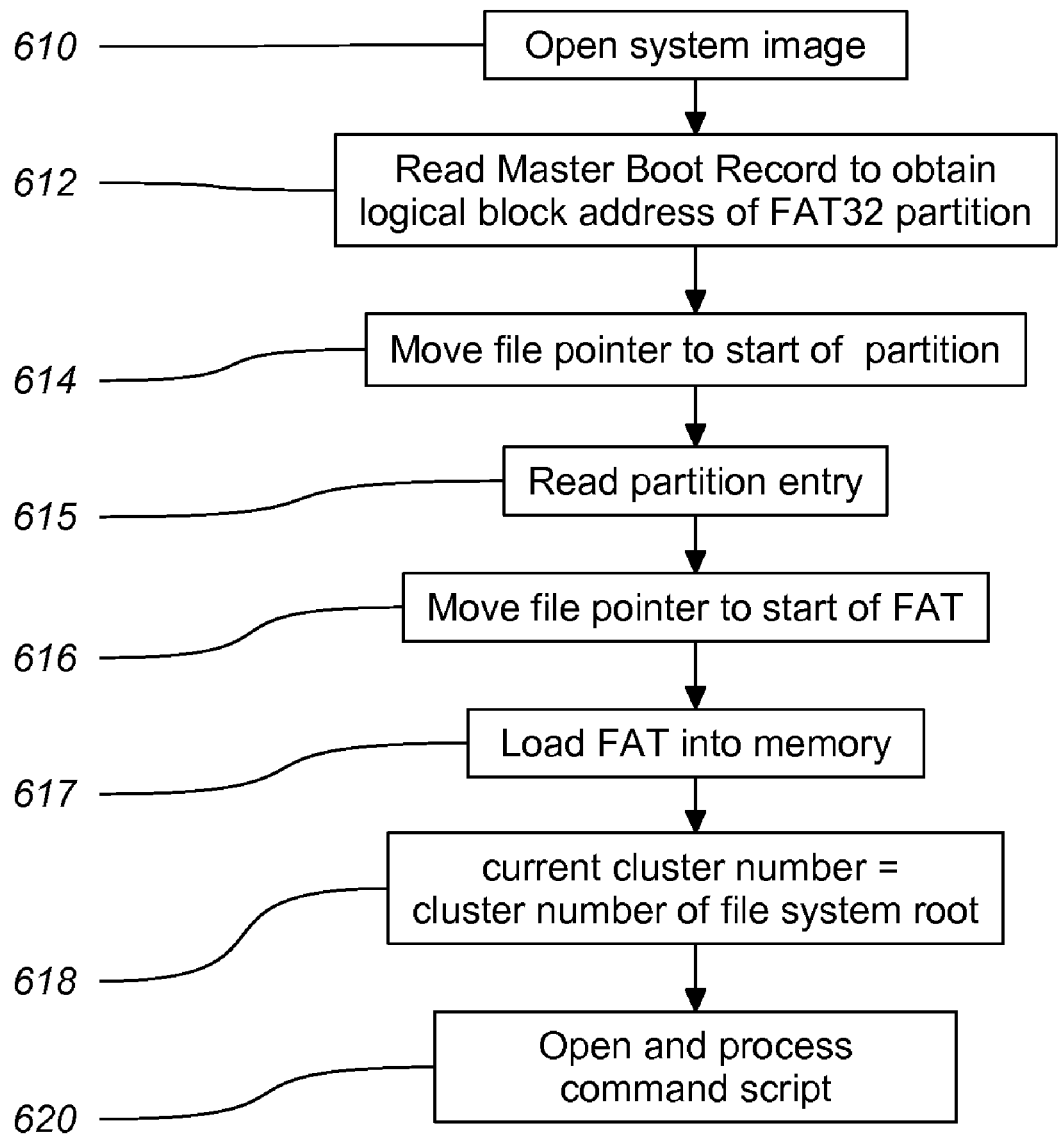
Figure 7:
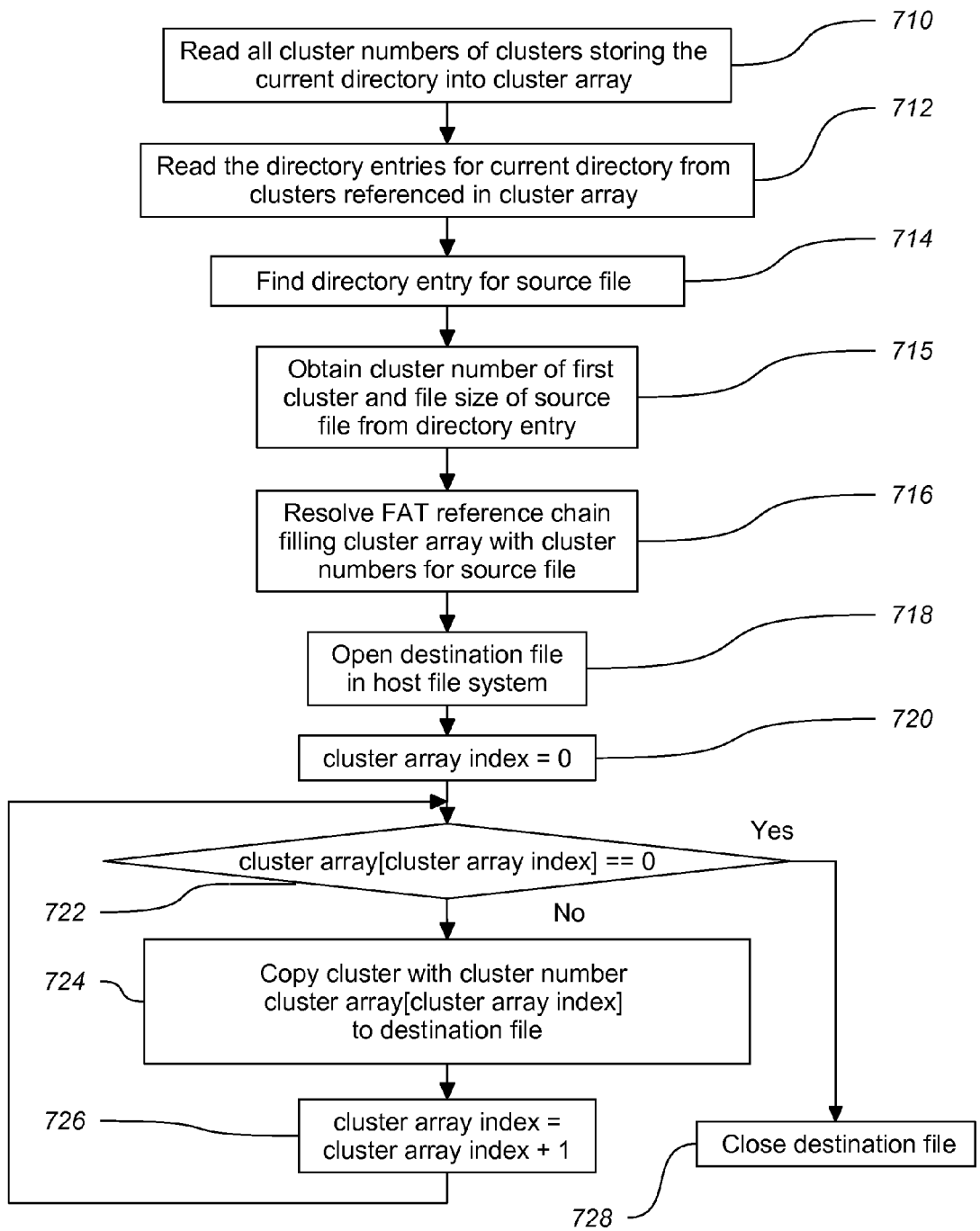
Figure 8:
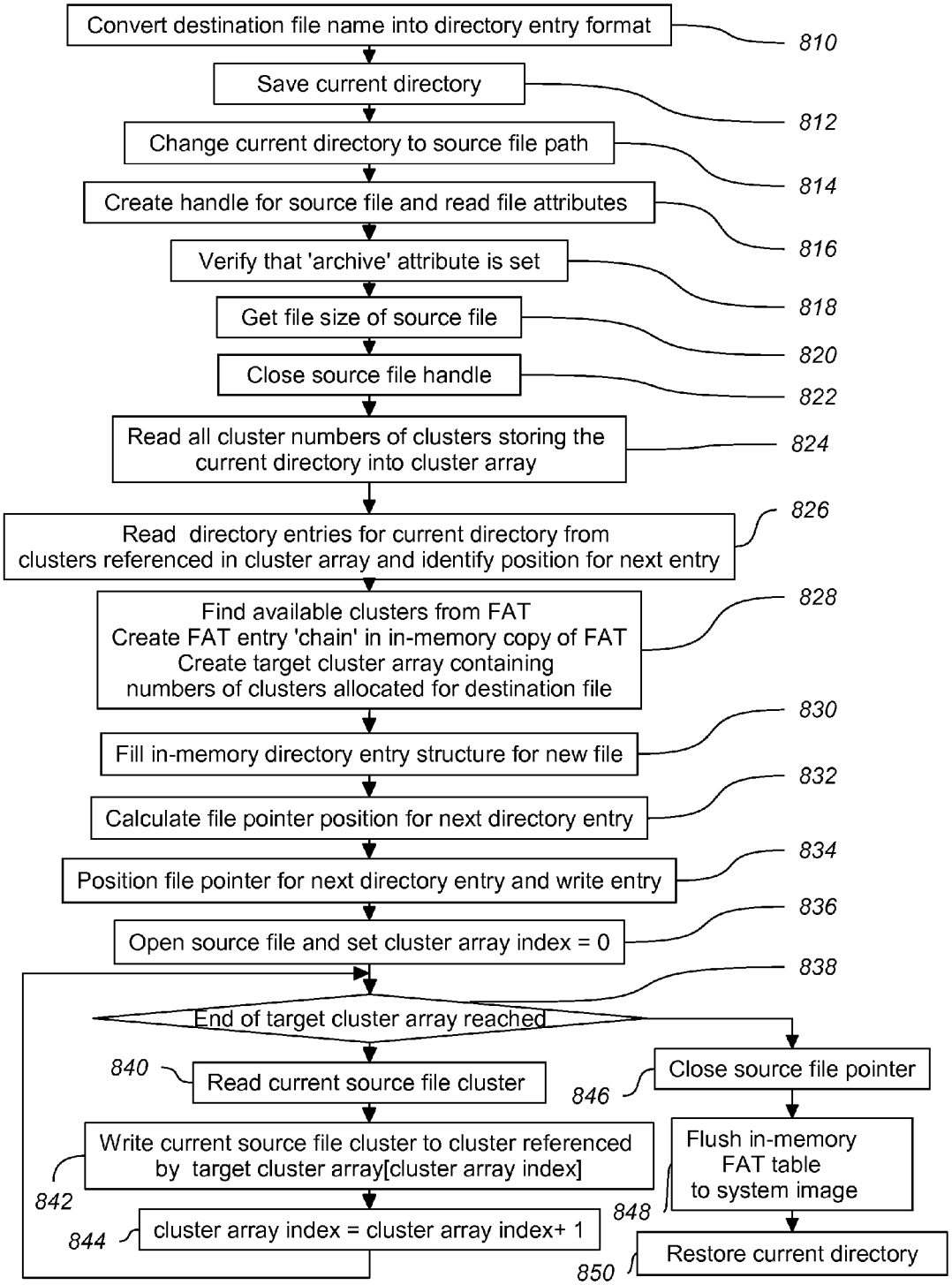
Figure 9:
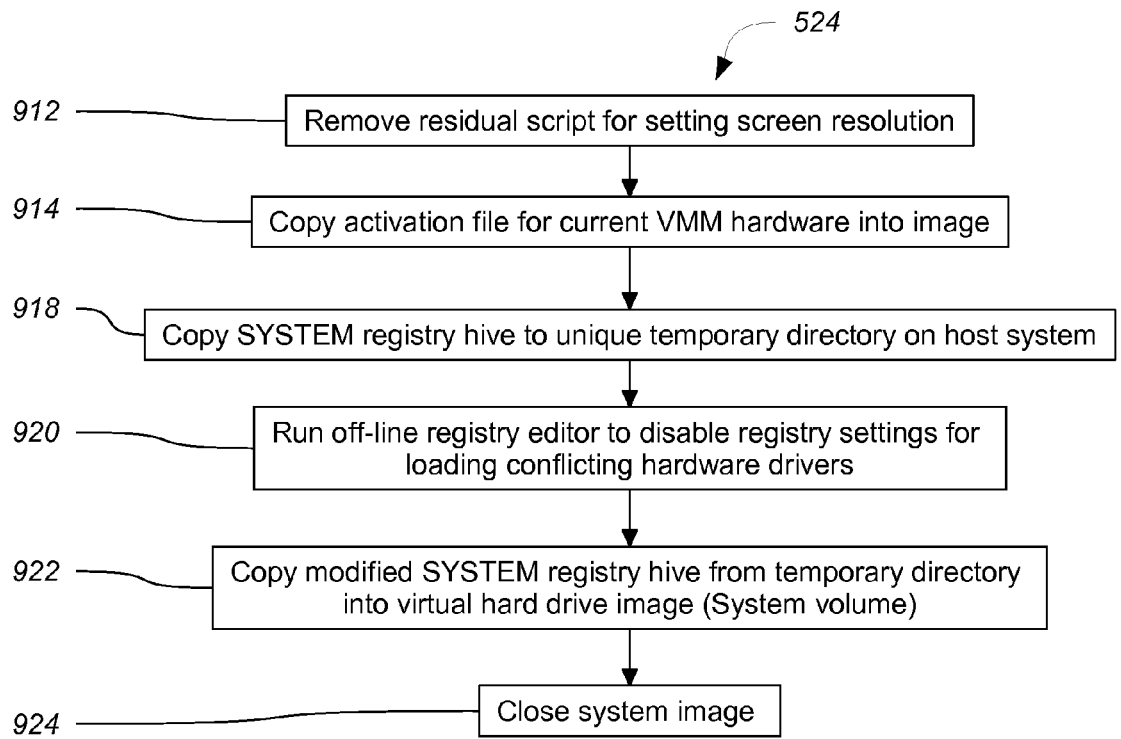

Before the image preparation script and its flow of execution are discussed in FIG. 9, the implementation of basic command shell functionality is explained. FIGS. 6-8 show: The flow of the command shell initialization (FIG. 6), the flow of a command shell file copy operation from the system image into the host's file system (FIG. 7), and the flow of a command shell file copy operation from the host's file system into the system image (FIG. 8).

FIG. 6

Command Shell Flow: Initialization—Opening System Image

The command shell is invoked with two arguments: The file name of the system image and a script file. Both files are stored on the external storage device. Before the script file is processed the command shell opens the system image (block 610).

The first sector of a disk drive structured according to the IBM PC partitioning scheme contains a Master Boot Record (MBR) (As already mentioned, the system image contains the same data structures as a physical disk). The MBR is a 512 byte (one sector) long structure comprising boot code and the partition layout of a disk drive. A partition can be regarded as a logical drive within a physical drive. The system image only contains one partition. The Master Boot Record (MBR) is read into memory to retrieve information about the start of the partition in the system image (block 612).

The partition in the system image is formatted with the FAT32 file system. The data in the FAT32 file system is organized in units of clusters. Clusters are contiguous blocks of 4-64 sectors. The cluster size depends on the partition size. The layout of the FAT32 file system is simple. The first sector of the partition is always the partition entry, which is followed by some unused space called the reserved sectors. Following the reserved sectors are two copies of the FAT (File Allocation Table). The FAT is a reference table for cluster numbers. Each FAT entry is mapped through its position in the table to a cluster in the file system. FAT entries corresponding to files or directories that are smaller than the cluster size contain a fixed value of 0xFFFFFFFF (hexadecimal). FAT entries for files or directories that extend beyond the current cluster reference the next cluster storing data of the respective file or directory. This implies that FAT entries for files larger than the cluster size are reference chains that end with the last entry 0xFFFFFFFF (hexadecimal). Entries mapped to unused clusters contain the entry 0x0 (hexadecimal). The remainder of the file system after the file allocation table is data arranged in clusters (see also http://www.pjrc.com/tech/8051/ide/fat32.html, Mar. 10, 2009).

After the MBR has been read, the start address of the partition is known. The file pointer is moved to the start of the partition at block 614. The first sector of the partition contains the partition entry. The partition entry contains information about the organization of data in the FAT32 file system on the partition, such as the number of sectors used for the file allocation table (FAT), the number of reserved sectors and the cluster number of the cluster containing the root directory. The partition entry is read at block 615.

Moving the file pointer past the reserved sectors (block 616), the FAT is read into memory at block 617. Next, the number of the cluster containing the root directory is assigned to a variable internal to the shell that always contains the cluster number of the current directory (block 618).

After the initialization of the shell, the script file is opened and shell commands are read sequentially from the script file (block 620). Every line in the script contains one shell command. The command shell executes a loop (not shown in the flow chart) that processes the script commands line-by-line.

FIG. 7

Command Shell Flow: File Copy Operation from System Image

In the FAT32 file system the FAT is a big array of integer values. As mentioned above, the position of each entry in the FAT corresponds to one cluster. The FAT entries are mapped linearly to clusters, typically starting with the second FAT entry being mapped to the first cluster. The value in each FAT entry refers to the next cluster that stores data of the corresponding file or directory. As indicated above, files smaller than the size of one cluster have a corresponding FAT entry of 0xFFFFFFFF (hexadecimal). Larger files are represented as a reference chain in the FAT. The FAT entry corresponding to a file's first cluster refers to the second cluster containing file data. The FAT entry corresponding to the second cluster refers to the third cluster etc. With the exception of the FAT entry corresponding to the last cluster of a file or directory, every FAT entry references the next cluster storing data for a file or directory, creating a reference chain. Each file or directory in the FAT32 file system is uniquely identified by the cluster number of the first cluster containing file or directory data.

The file copy command for file copy operations from the system image into the host system's file system uses the cluster number of the current directory for copy operations. Changing the current working directory to a sub-directory is accomplished by identifying the cluster number of the respective sub-directory through the directory entry and setting the current cluster number variable accordingly. The implementation of the command shell uses a global cluster array (global means that the array is accessible by all of the program's functions) for storing the cluster numbers of directories or files.

FIG. 7 shows the flow of a file copy operation from the system image into the host's file system. At block 710 the numbers of all clusters storing the current working directory are read into the cluster array, following the cluster chain in the FAT, starting with the cluster number of the first cluster of the current directory.

At block 712 the directory entries for the current working directory are read traversing through all clusters in the cluster array. The directory entry for the source file is identified by comparing the source file name to the file names in the directory entries (block 714).

Once the directory entry for the source file has been found the cluster number of the first cluster and the file size of the source file are read from the directory entry (block 715). The global cluster array is re-initialized to contain only zeros and is then filled with the numbers of the clusters storing the source file (block 716). The cluster numbers are obtained following the reference chain in the FAT, starting with the cluster number of the first cluster of the source file.

The destination file in the host's file system is opened at block 718 and the variable used for indexing the cluster array is set to zero.

With the decision block 722 a loop is entered that copies all clusters of the source file to the destination file in the host's file system. At block 722 it is determined whether the end of the cluster array was reached by checking whether the cluster array element indexed by the cluster array index is zero. At block 724 the cluster indexed by the current cluster array index value is copied to the destination file. The cluster index is incremented at 726 and the loop returns to decision block 722. If the end of the cluster array was reached the destination file is closed. The flow chart is slightly simplified in that in the actual implementation only the remaining bytes in the last cluster are written to the destination file.

After the file copy operation from the system image to the host's file system is complete the next command is read and processed by the command shell.

FIG. 8

Command Shell Flow: File Copy Operation into System Image

FIG. 8 shows the flow for a file copy operation from the host's file system into the system image. At block 810 the file name of the destination is converted into the format that is used for storing file name and file name extension in a directory entry. At block 812 the current directory in the host's file system is stored for later restoration at block 850. Next the current directory is changed to the directory in the host's file system that stores the source file (block 814). A file handle is created for the source file at block 816 in order to obtain file attributes of the source file. It is verified at block 818 that the source file's archive attribute is set, indicating that the source file is a regular file. The size of the source file is obtained at block 820 and the file handle is closed at block 822. Next the cluster numbers of all clusters storing the current working directory are read into the cluster array, following the cluster chain in the FAT, starting with the cluster number of the first cluster of the current directory (block 824).

At block 826 all directory entries stored in the clusters referenced by the cluster array are read. The position of the next available directory entry is identified. It is determined whether the next directory entry can be inserted replacing a deleted entry or needs to be placed below the last directory entry or needs to be added as the first entry at the beginning of a new cluster that needs to be allocated.

At block 828 available clusters are identified looking for a sufficient number of FAT entries containing zero, to accommodate the number of clusters required for the destination file. This number is known as the file size of the source file was determined at block 820. A reference chain for the destination file is created and the in-memory copy of the FAT is updated accordingly. A second cluster array, in the following referred to as 'target array' is first initialized with zero entries and then filled with cluster numbers of clusters that have been allocated for the destination file. When traversing through the target array in block 838 the first zero entry indicates that the last cluster has been copied into the system image.

At block 830 an in-memory data structure for a directory entry is filled with the destination file name, file size and start cluster. The file pointer position (in the system image file) for the next directory entry (obtained at block 826) is calculated (block 832). The file pointer is positioned at the calculated position and the in-memory directory entry is written to the system image file (block 834).

The source file is opened at block 836 and the index variable used for filling the target array is set to zero. With the decision block 838 a loop is entered that copies all clusters of the source file in the host's file system to the destination file. At block 840 the current cluster in the source file is read. The cluster is then written to the cluster referenced by the element of the target cluster array referred to by the current cluster array index (block 842). Next the cluster array index is incremented (block 844) and the loop is reentered at block 838. Block 838 determines whether the end of the cluster array has been reached by checking whether the target cluster array element indexed by the current cluster array index is set to zero.

If the end of the cluster array was reached the file pointer to the source file is closed (block 846). Next the in-memory FAT table is written to the system image (block 848) and the current working directory in the host's file system that was stored at block 812 is restored at block 850.

After the file copy operation from the host's file system into the system image is complete the next command is read and processed by the command shell.

FIG. 9

Image Preparation Script Flow

FIG. 9 shows the flow of the image preparation script that is invoked at block 524 and is processed by the command shell described in the previous three sections. The location of the system image file and the image preparation script are passed as arguments.

If there is a residual script for setting the screen resolution for the VirtualBox VMM, the script is deleted (block 912).

As mentioned above, the image preparation is necessary to ensure that the portable Windows installation is activated on all emulated hardware platforms. Moreover mouse driver conflicts that arise when the portable OS is run on different VMMs need to be resolved.

The first issue addressed by the image preparation program is the hardware dependency of Windows XP's product activation. The product activation of a Windows XP installation that has been activated in one type of VMM is invalidated when the virtual machine is booted in a different VMM. In this case, hardware related information captured in the Windows Product Activation (WPA) file does not match the hardware emulated by the current VMM type.

The external storage device contains valid WPA files for supported VMM types. At block 914 the image preparation program copies the activation file that matches the hardware emulated by the selected VMM into the system image.

Another problem related to the emulation of different hardware components for different VMM types is a conflict of device drivers for the pointing device (mouse): VMWare's VMware Tools is a set of drivers and services that improve virtual machine performance. After the installation of these drivers and services in the guest OS, VMWare's VMM uses a specific mouse driver named vmmouse.sys. This driver uses services provided by the underlying generic mouse class driver mouclass.sys. The 'add-on' tools to the Virtual PC VMM serve the same purpose as the VMware Tools and are also installed in the guest system. Virtual PC 'add-on' tools install a different mouse class driver named msvmmouf.sys that is also layered over the generic mouse class driver mouclass.sys. The VirtualBox VMM does not use any specific mouse drivers and requires that vmmouse.sys as well as msvmmouf.sys be disabled. While the details of the Windows driver model are not relevant for this discussion, the key issue is a driver conflict between vmmouse.sys and msvmmouf.sys. Booting a virtual machine in Microsoft's VirtualPC VMM with the registry settings for loading VMWare's mouse driver (and vice versa) will result in a non-functional pointing device. It is not possible to load a set of mouse drivers that support both VMMs.

To solve the problem of conflicting device drivers for the pointing device, different registry settings are required for each VMM type. Only mouse drivers for the selected VMM must be enabled in the registry, while all other mouse drivers must be disabled. As it is not known in advance which type of VMM will be used for the next launch, the registry settings cannot be modified in the running virtual machine. The image preparation program modifies conflicting registry settings before the virtual machine is launched. Registry entries determine the sequence for loading device drivers during the startup process of a Windows system. The registry is split into a number of logical sections, or 'hives' (See Wikipedia on-line encyclopedia article, "Windows Registry", http://en.wikipedia.org/wiki/Windows_Registry#Hives, Mar. 10, 2009).

In a system that is not running, the information in each registry hive is stored in a registry hive file (Mark E. Russinovich, David A. Solomon, 2005, "Microsoft Windows Internals"). The settings that contain driver related information are stored in a registry hive file named 'SYSTEM'. To change registry settings before the system is launched, the SYSTEM registry hive file is copied by the described command shell from the system image into the temporary directory on the host system (block 918).

An off-line registry editor stored on the portable virtual machine is invoked by the command shell. The mouse driver conflict is resolved before the start of the virtual machine by setting the required registry entries in the copy of the SYSTEM registry hive file at block 920. The off-line registry editor is invoked from the command shell and is a version of the freely available tool chntpw that was modified to support non-interactive registry modifications (Offline NT Password and Registry Editor, http://home.eunet.no/pnordahl/nt-passwd). The modified registry hive is then copied back into the system image (block 922), overwriting the original hive file. In block 924 the system image is closed.

After the image has been prepared in block 524 (see also FIG. 9), a string identifying the VMM type the system image has been prepared for, is stored in a file on the portable device (block 525). If this VMM type is selected for the next launch, this information is read in block 512 and the image preparation step is subsequently skipped in decision block 522. If VirtualBox is the selected VMM, the auto-generated script for setting the screen resolution, created in block 520, is copied into the system image using the command shell (block 526).

The next execution step 528 is also specific to the VirtualBox VMM. Virtual hard disks in VMware and Microsoft format start with the content of the virtual hard disk image. VirtualBox stores information about the virtual hard disk in a header section before the actual disk image.

As mentioned above, the first sector of a disk drive structured according to the IBM PC partitioning scheme contains a Master Boot Record (MBR). Analogous to the physical hard disk structure, the first sector of a fixed-size virtual hard disk in VMware or Microsoft format also contains the MBR.

A virtual hard disk in VirtualBox's Hard-Drive Interface (VDI) format begins with the VDI header, followed by the MBR. To allow virtual hard disk portability across VMMs, it is necessary to dynamically add and remove the VirtualBox specific header structure. The image preparation program and other utility programs for direct image access rely on a virtual hard disk layout that starts with the MBR. Image file conversion to the VDI format could be achieved by creating a header file and then appending the image file. This approach however, entails a copy operation of a large image file. Considering the duration required for this copy operation, this approach is not feasible. The virtual machine launch program converts images between the VirtualBox and non-VirtualBox format by overwriting the beginning of the virtual hard disk image file.

Depending upon whether the image file is converted to (block 528) or from (block 540) the VDI format, one of two files is used to overwrite the first blocks of the virtual hard disk image file. The file used for the conversion to the VirtualBox format contains the VDI virtual hard disk header, followed by the MBR. The file used for the conversion from the VirtualBox format to the format used by VirtualPC or VMware consists of a second MBR configuration without the VDI header.

FIG. 10

Master Boot Record Configurations

Figure 10A:
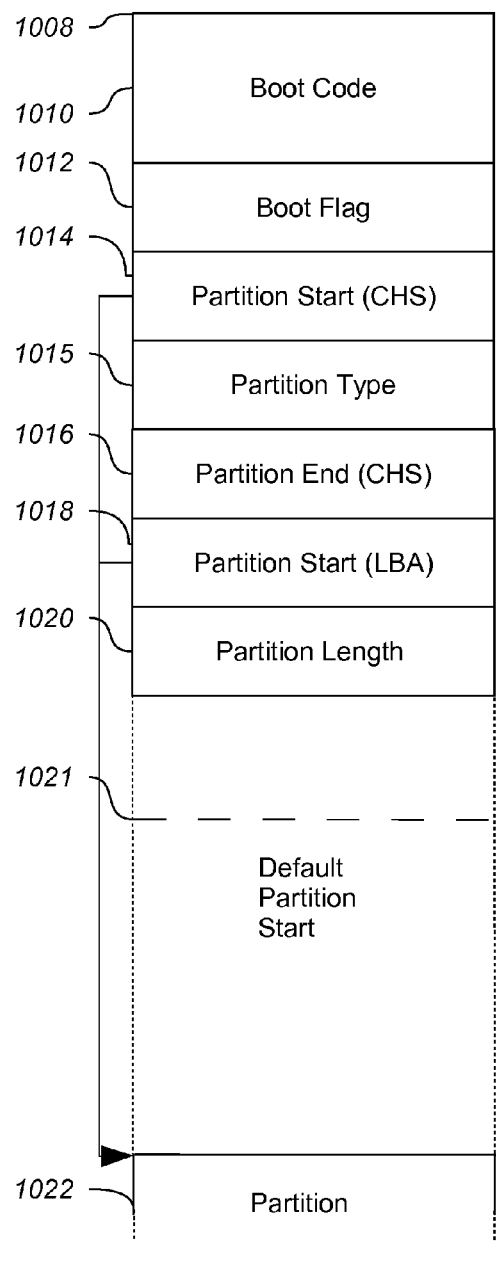
Figure 10B:
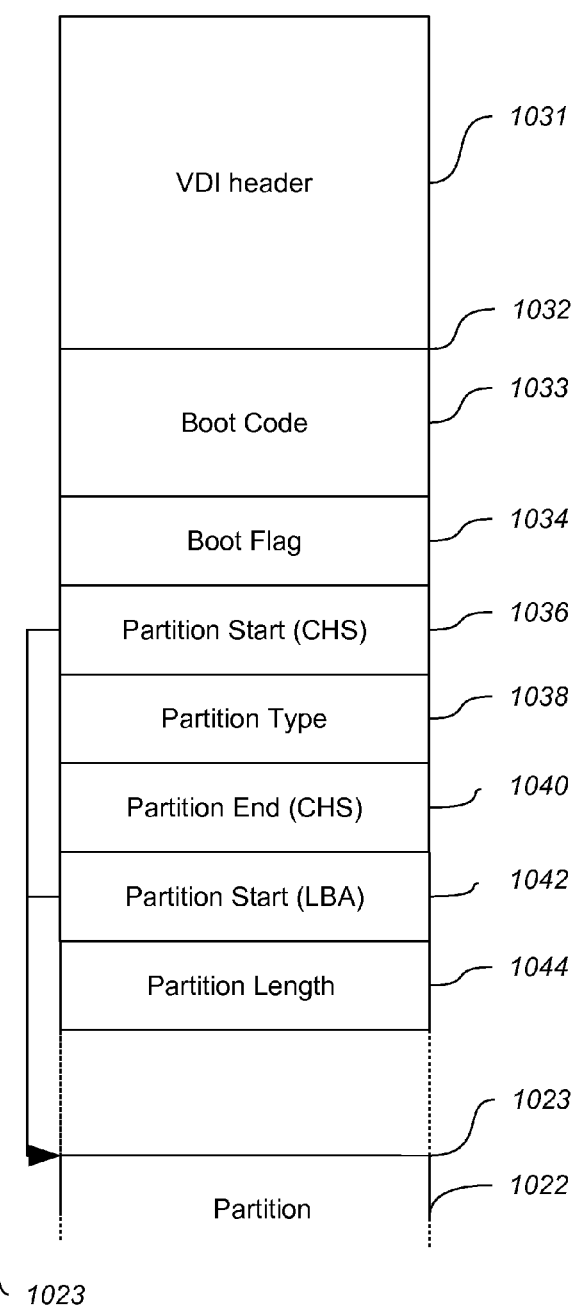

As shown in FIGS. 10A and 10B, two different MBR configurations are required as the MBR references the beginning of the partition relative to the start of the MBR. The different start addresses 1008 and 1032 of the MBR are illustrated in FIGS. 10A and 10B. The partition's absolute start sector 1023 is identical for VDI and non-VDI formats. The start and end sectors of the partition relative to the start of the MBR are different.

FIG. 10A illustrates the relevant sections of the MBR data structure for virtual hard disks that are not in VDI format. The MBR contains boot code 1010 and a partition table that references the logical partitions on the disk. Blocks 1014, 1016, 1018, 1020 show the structure of the first entry in the partition table. MBR references to other partitions are not shown. In the context of the described configuration the virtual hard disks only contain one logical partition.

The reference to the logical partition is stored redundantly in the MBR's partition table: First it is stored in the form of the partition's start and end sector in CHS (Cylinder Head Sector) format (references 1014 and 1016), secondly as linear block address (LBA) 1018 of the sector number of the first partition sector, followed by the length of partition 1020 in sectors. To create a MBR partition reference that references the same absolute partition start 1023 for the VDI and non-VDI formats, the partition pointers referencing the default partition start 1021 were modified. The number of blocks required to store the VirtualBox header were added to the default MBR references that originally pointed to default partition start 1021. Effectively, default partition start 1021 was moved by the size of the VDI header to a new partition start at 1023. After the modification MBR references 1014, 1016 and 1018 point to the 'moved' partition. The same approach was taken for the virtual hard disk storing user data. For the virtual hard disks for system and user data, the sectors from the beginning of the virtual hard disk file to the beginning of the logical partition are stored as separate files on the external storage device.

FIG. 10B shows the layout at the beginning of a virtual hard disk in VDI format. This image file starts with the VirtualBox header 1031, followed by the MBR. Relative to the start of the MBR, partition references 1036, 1040, 1042 in this configuration are the default values, referring to sector 63 for the partition start. As for the non-VDI format, the virtual hard disk sectors from the beginning of the virtual hard disk to the beginning of the logical partition are saved in separate files (for user and system data) on the external storage device.

Image conversion 528 is performed if the selected VMM is VirtualBox. The VirtualBox header and MBR configuration files for system and user data virtual hard disks are written at the beginning of the virtual hard disks. The previous MBR configurations are overwritten. After shutdown of virtual machine in block 540 the MBR configurations for the Microsoft/VMware format are written to the beginning of the image files, overwriting the VirtualBox specific configurations.

Execution step 530 creates a virtual machine configuration. For Microsoft and VMware VMMs, templates of virtual machine configuration files are used. These configuration templates contain general fixed settings and placeholders that are dynamically filled with host specific information obtained in the autodetection process. This information was read by launch program in block 510. The configuration files generated from the templates are written to the temporary directory. The virtual machine configuration process depends upon the VMM type.

In the first embodiment the virtual machine configuration template for VMware VMMs defines virtual machine autodetection for a CD-ROM drive, a virtual sound device, and a virtual network connection through the host's network interface using network address translation (NAT). The Media Access Control (MAC) address of the virtual network interface is set to a fixed value read from a configuration file on the portable storage device. The disk drives are configured as 'independent-nonpersistent', to enable COW. Even though the keyword 'nonpersistent' is used in the configuration file, the given configuration enables optional persistence for the virtual hard disks, as will be explained in more detail below.

The dynamic configuration process first configures the amount of memory to be used by the virtual machine. Per default, the amount of memory is set to the amount of available memory that was autodetected in block 416 minus 120 MB, to avoid memory contention between host and guest system. The launch program is embedded in a GUI that includes an advanced configuration interface to modify the amount of virtual machine memory. Next, the autodetected screen resolution is written to the configuration template.

The VMware configuration template variable 'workingDir' is set to refer to the temporary directory. This variable defines the location of the overlay files. The final configuration settings for VMware attach the virtual hard disk files for page 232, system 224 and user data 226 to the virtual machine (virtual hard disks 210, 212, 214). The overlay files for system and user data are generated automatically in the temporary directory as it is referenced by the workingDir configuration variable.

As mentioned, the virtual hard disk files for system 224 and user data 226 become the virtual hard disk base files after the launch of the virtual machine. Before the virtual machine is launched, a background thread is spawned that periodically checks if virtual hard disk overlay files have been created in the temporary directory. If the overlay files are identified, the thread removes write permissions from the overlay files (block 542) and exits. Without the modification of write permissions, VMware's VMM deletes the overlay files after shutdown of the virtual machine. Changing the permissions allows the data in the overlay files to be merged after shutdown, making the virtual hard disk data persistent.

As for VMware VMMs, the virtual machine configuration template for VirtualPC defines a virtual sound device and a virtual network connection through the host's network card using network address translation (NAT). The virtual machine is configured to autodetect a CD-ROM drive attached to the host system. The undo setting for disk drives is configured as enabled, to configure COW and the generation of overlay files.

The virtual machine configuration process starts with the configuration of the amount of host memory to be used by the virtual machine. The amount is calculated as described in the previous section and can be modified through the launch GUI's advanced configuration menu. The explicit definition of a location for the overlay files is not necessary, as Virtual PC implicitly creates the virtual hard disk overlay files in the directory where the virtual machine configuration file is located.

Analogous to the VMware virtual machine configuration, the dynamically expanding virtual hard disk file for page data 232, and the virtual hard disk files for system 224 and user data 226 are attached to the virtual machine (virtual hard disks 214, 212, 210). As described in the previous section for VMware VMMs, an execution thread is spawned after the virtual machine configuration to remove write permissions from the overlay files 542.

For VirtualBox VMMs the virtual machine configuration is created by means of a script that contains commands for the creation and configuration of the virtual machine. This approach was chosen as the VirtualBox documentation discourages the direct configuration of VirtualBox's XML files (Innotek VirtualBox User Manual Version 1.5.2, innotek GmbH, Oct. 18, 2007). Instead of setting dynamic parameters by means of filling out templates, the launch program sets dynamic parameter values as environment variables that are implicitly passed to the script. The script is invoked with Window's 'system' API function.

This approach allows using one script, stored on the external storage device. The script configures the virtual machine through the VBoxManage command line interface. Before the script for the virtual machine creation is invoked, the launch program sets the VirtualBox specific environment variable VBOX_USER_HOME to refer to the temporary directory.

Next, the environment variables for the configuration of the virtual machine are set by the launch program. One variable setting contains the amount of virtual machine memory. Another variable indicates the location of the CD-ROM drive that was identified by the launch program.

Next the PATH environment variable is set to refer to the directory on the host system that contains the VirtualBox commands. After the definition of all environment variables the script that creates the virtual machine is called from the launch program. All environment variables set in the launch program are accessible in the script.

FIG. 11

Virtual Machine Creation and Configuration for Virtualbox Vmm

Figure 11:
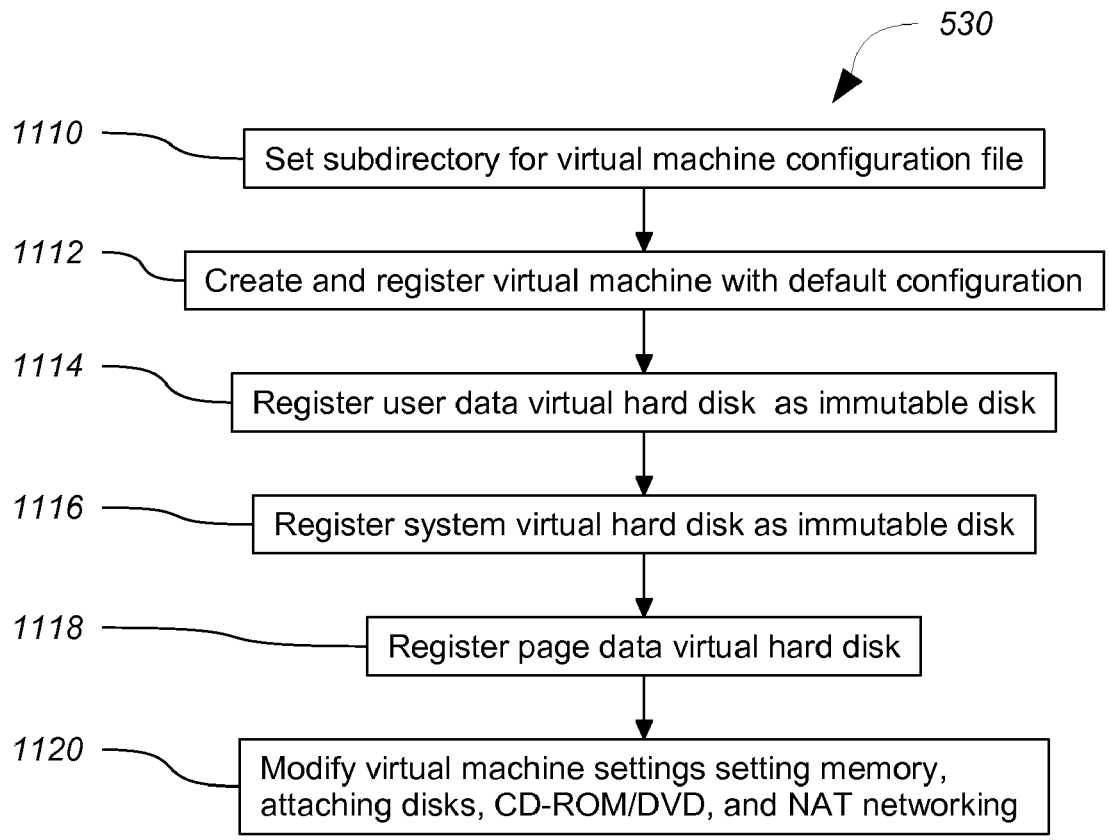

FIG. 11 shows the execution flow of the script that creates and configures a virtual machine for VirtualBox. With the environment variable VBOX_USER_HOME referencing the temporary directory VirtualBox uses the temporary directory as the default location for the global configuration file that will be created when the script is executed. In addition to setting VBOX_USER_HOME the VBoxManage command 'setproperty machinefolder <location of temporary directory>' needs to be executed to ensure that all files related to the virtual machine are created in the temporary folder or one of its subdirectories (block 1110). Block 1112 creates and registers a virtual machine with a default configuration. Blocks 1114-1118 register the virtual hard disks for user data, system data, and page data. The virtual hard disks for system and user data (blocks 1114 and 1116) are registered as 'immutable' disks (VirtualBox terminology) to enable COW. Unlike the other VMMs VirtualBox has the concept of a global configuration file that contains entries for all virtual machines and virtual hard disks on a host system. The registration of virtual machines and virtual hard disks creates the respective entries in the global configuration file.

Block 1118 registers the virtual hard disk for page data. Block 1120 modifies the default configuration created in block 1112. The memory for the virtual machine is configured, the CD/DVD drive is attached, sound support and NAT networking are configured and the three virtual hard disk files 224, 226 and 232 are attached as virtual hard disks 210, 212 and 214 (see FIG. 2).

For the memory and CD/DVD configuration the environment variables set by the launch program are used. For VirtualBox, the permissions on the overlay files do not have to be modified. The invocation of a function that deletes the overlay files after shutdown of the virtual machine (wipeOutImmutableDiffs( )), was removed from the source code.

In block 532 (see FIG. 5) the virtual machine is launched using the command line interface for the selected VMM through the QProcess class provided by the QT toolkit.

After shutdown of the virtual machine, decision block 533 determines if the overlay file containing user data (230) will be merged with the corresponding base file (226). The illustration of decision block 533 has been simplified. The GUI embedding the launch process includes an 'Advanced Configuration' menu that allows for customizing the user interaction at this point of the execution flow. Three options are configurable for user and system data: 1. Always merge without prompting the user 2. Prompt the user if data should be merged 3. Always discard data. Depending on the respective selection overlay file 230 is merged with the corresponding base file 226 or the merge operation is skipped. Analogous to the decision block 533 for merging user data, decision block 537 determines if the overlay file for system data 228 will be merged with base file 224.

In case the VirtualBox VMM was used for the virtual machine launch, the virtual hard disk images for system and user data are converted back to a header free format (block 540).

After completion of blocks 538 and 540 the launch GUI is displayed again and the launch program waits for further commands (block 514).

To understand the merge process in blocks 534 and 538, it is necessary to first understand the virtual hard disk configurations for each VMM type. Each respective virtual hard disk configuration needs to enable image portability across VMMs and COW access. The following sections explain the virtual hard disk configuration for each VMM type. After introducing the configuration, the algorithms used for merging the overlay files are described in detail.

FIG. 12

Cow Runtime Configuration of Virtual Hard Disks in Vmware Format

Figure 12:
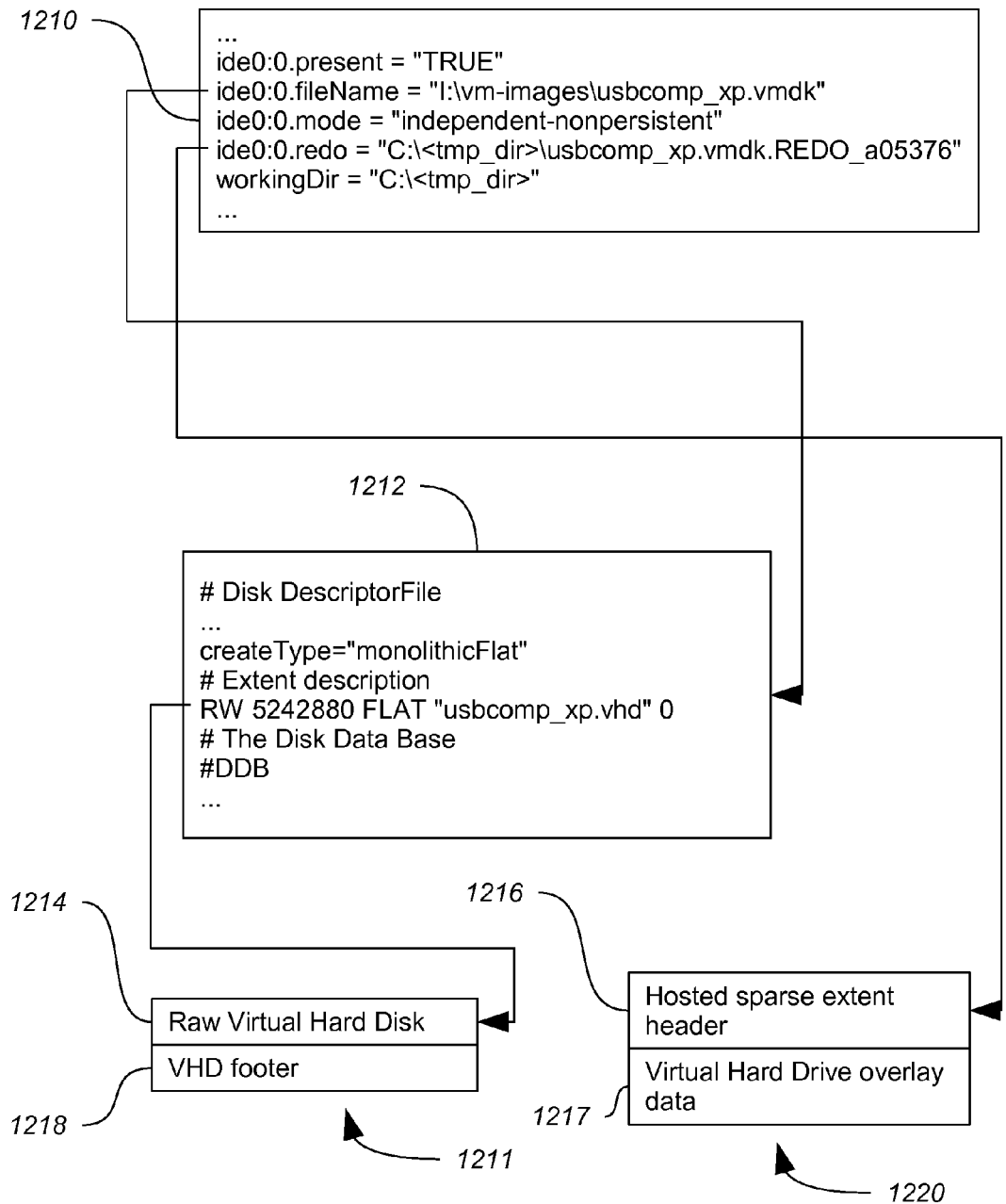

FIG. 12 illustrates the runtime configuration of the virtual hard disks storing system or user data in VMware format. In VMware terminology the drives are configured as 'independent nonpersistent' indicating that COW is enabled for a virtual hard disk. For fixed size, pre-allocated virtual hard disks, virtual machine configuration file 1210, created in the temporary directory from the configuration template (block 530), references a so called disk descriptor file 1212. The disk descriptor file contains data about the virtual hard disk. The file is not changed in the configuration process of the virtual machine and named with the mandatory filename extension vmdk on the external storage device. Only the descriptor parameters relevant for the described virtual hard disk configuration are shown.

The createType parameter in the descriptor file identifies the type of virtual hard disk. This variable is assigned the string 'monolithicFlat'. This keyword indicates that the virtual hard disk base is not split into multiple files and that the virtual hard disk space was pre-allocated at creation time of the virtual hard disk. The line under the comment line '# Extent description' in the descriptor file references the file on which the virtual hard disk data is stored. The reference line in the descriptor also contains a Read/Write access flag and the size of the virtual hard disk in sectors. The disk database in the last section of the descriptor contains VMware version info and disk geometry information. File 1211 is the virtual hard disk base file (224 or 226) stored on the portable storage device. This data is stored in 'raw' format. The term 'raw' refers to the fact that the low-level data block structure on the virtual hard disk file is identical to the low-level data block structure on a physical hard drive. Raw image 1214 is referenced by all VMM types described here, either directly (Microsoft Virtual PC) or indirectly (VMware, VirtualBox). Microsoft VirtualPC requires the file extension vhd for direct access to the virtual hard disk.

As VMware does not require a specific extension for the file referenced in the descriptor, the use of this extension does not create a conflict. Moreover, Virtual PC requires a one sector long footer at the end of virtual hard disk 1218. This footer does not need to be removed as it is ignored by VMware VMMs and VirtualBox.

File 1220 is the virtual hard disk overlay file (228 or 230) and is referenced directly by virtual machine configuration file 1210. The configuration entry for the overlay file in 1210 is created by the VMM at startup time of the virtual machine. The overlay file is created in the directory referenced by the parameter workingDir in the virtual machine configuration file.

In block 530 the virtual machine configuration parameter workingDir is set to reference the temporary directory. While the virtual hard disk base is stored in raw format, the overlay file is stored in the VMware specific 'hosted sparse extent' format (VMware Technical Note: "Virtual Disk Format 1.0", Revision: 20060308, Version: 1.0, 2006). The format includes a header 1216 that contains metadata information i.e. data on the organization of data blocks in the overlay file. The data in the overlay file is managed in units of grains, which are 64 KB sized data blocks.

FIG. 13

Structure of Virtual Hard Disk Overlay File in Vmware Format

Figure 13:
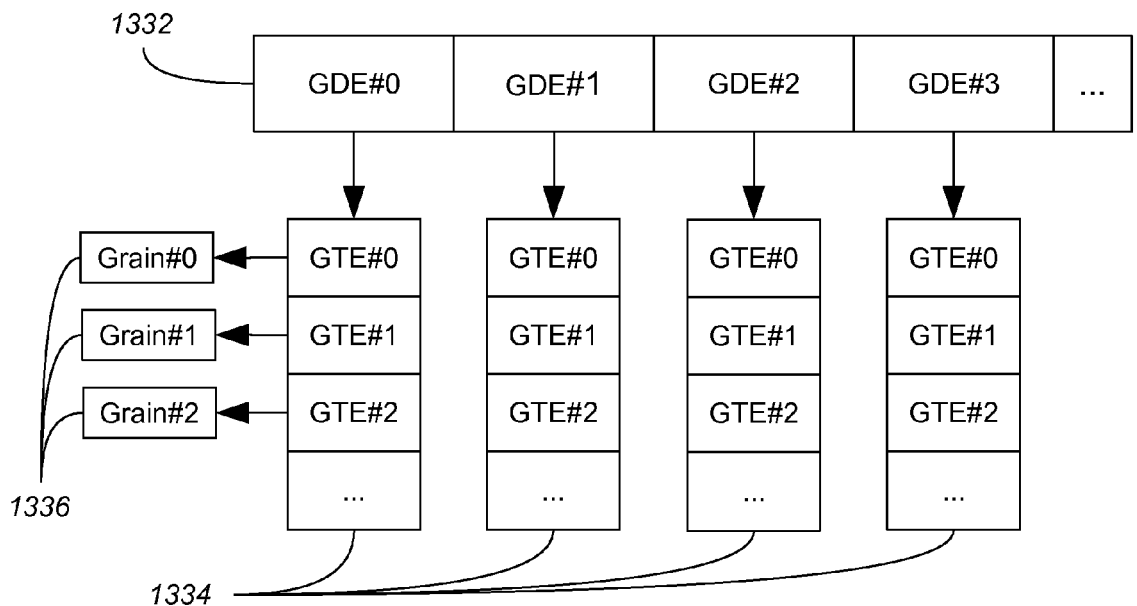

FIG. 13 shows how grains are stored in the overlay file. Grains are referenced through two levels of indirection. Grain directory entries 1332 reference grain tables 1334. Grain tables reference grains 1336. Grain tables are contiguous lists of 512 grain references. Grain table entries with NULL pointer references indicate that the corresponding grain is located in the virtual hard disk base file.

FIG. 14

Merge Process Flow of Virtual Hard Disk Overlay File in Vmware Format

Figure 14:
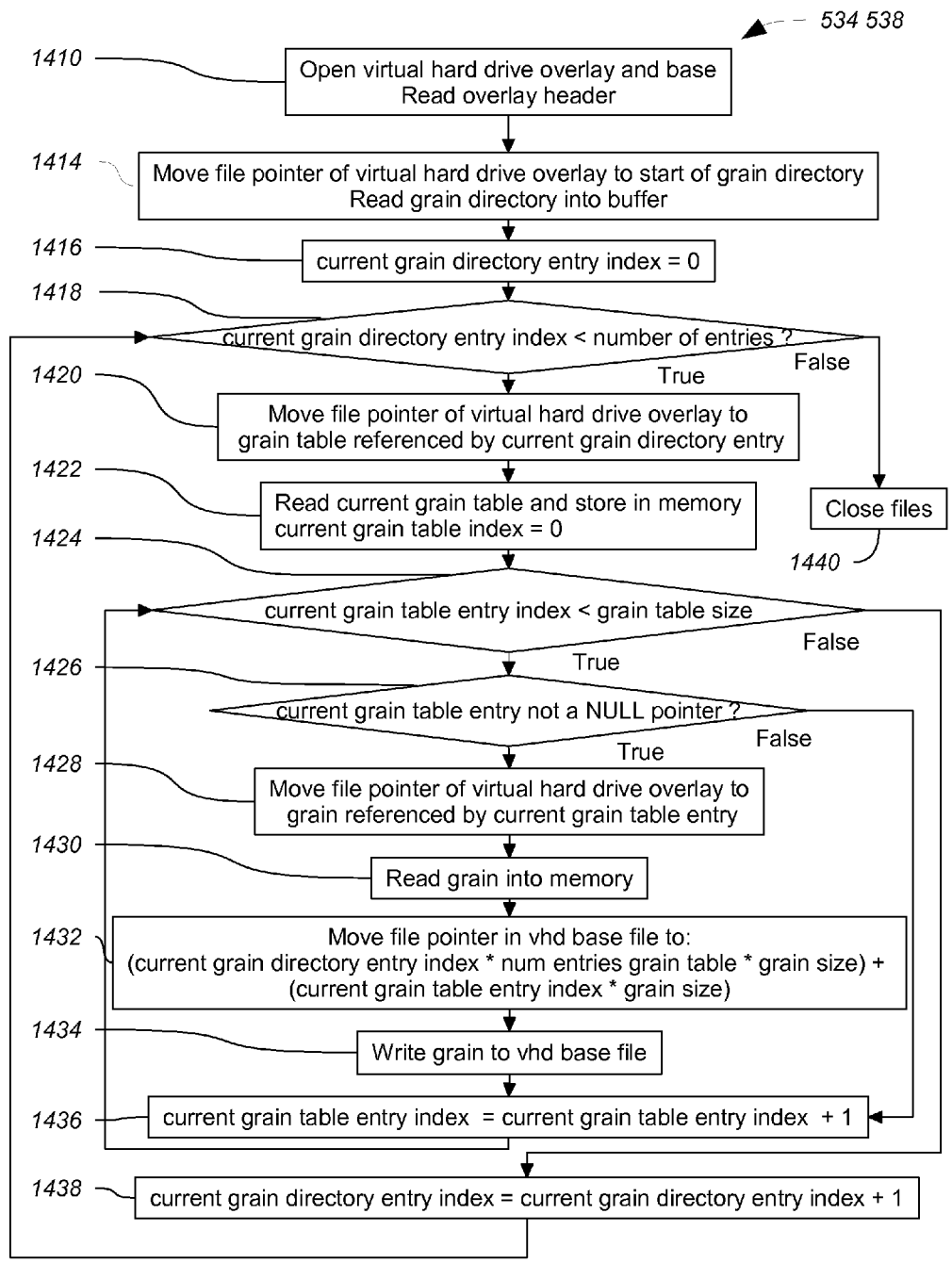

FIG. 14 illustrates the flow of a merge operation as performed in block 534 and 538 in FIG. 5. First overlay file 230 (or 228), and base file 226 (or 224) are opened and the header of the overlay file is read (block 1410). This header contains all references to the relevant metadata structures, as for example the reference to the grain directory 1332. The size of the grain directory is calculated from the virtual disk size, the grain size and the number of grain entries per grain table:

grain directory size=virtual hard disk capacity/(grain size*number of entries in grain table)

All three values on the right side of the formula are retrieved from the header that was read in block 1410. If the virtual disk size is not a multiple of 32 MB (assuming the default of 512 entries in the grain table), the grain directory size is rounded up to the next integer value. The obtained value is used to allocate a sufficient amount of buffer space for reading the grain directory into memory (block 1414).

Next the code executes two nested loops. The outer loop is entered first and sequentially traverses through all grain tables referenced by the grain directory (blocks 1418-1438).

After processing the last grain directory entry, the overlay file and the base image file are closed in block 1440.

At the beginning of the outer loop, the file pointer for the overlay file is positioned at the beginning of the current grain table in block 1420 (A file pointer is a 64-bit offset value that specifies the next byte to be read or the location to receive the next byte written). The current grain table is read and stored in memory and the grain table index is set to 0, referencing the first grain table entry in the current grain table (block 1422).

The inner loop (blocks 1424-1436) sequentially references all grain table entries in the current grain table. In block 1426 the program checks if the current grain table entry contains a NULL pointer reference. If this is the case the next entry is read as the data block corresponding to the reference is stored in the virtual hard disk base.

If the current grain table entry does not contain a NULL pointer reference, the overlay file pointer is moved to the beginning of the grain referenced by the current grain table entry (block 1428) and the grain is read into memory (block 1430). Next, the file pointer of the base image file is positioned at the location that corresponds to the current grain (block 1432). Then the grain is written to the virtual hard disk base (block 1434). The location corresponding to the current grain is calculated as follows:

grain position in base image=(current grain directory entry index*number of entries in grain table*grain size)+(current grain table entry index)*grain size After the grain has been written the grain table index is incremented. The next grain reference is processed, if the incremented grain table index does not exceed the number of entries in the grain table (decision block 1424). If all grain table entries have been processed the grain table referenced by the next grain directory entry is processed (block 1438).

FIG. 15

Cow Runtime Configuration of Virtual Hard Disks in Microsoft Format

Figure 15:
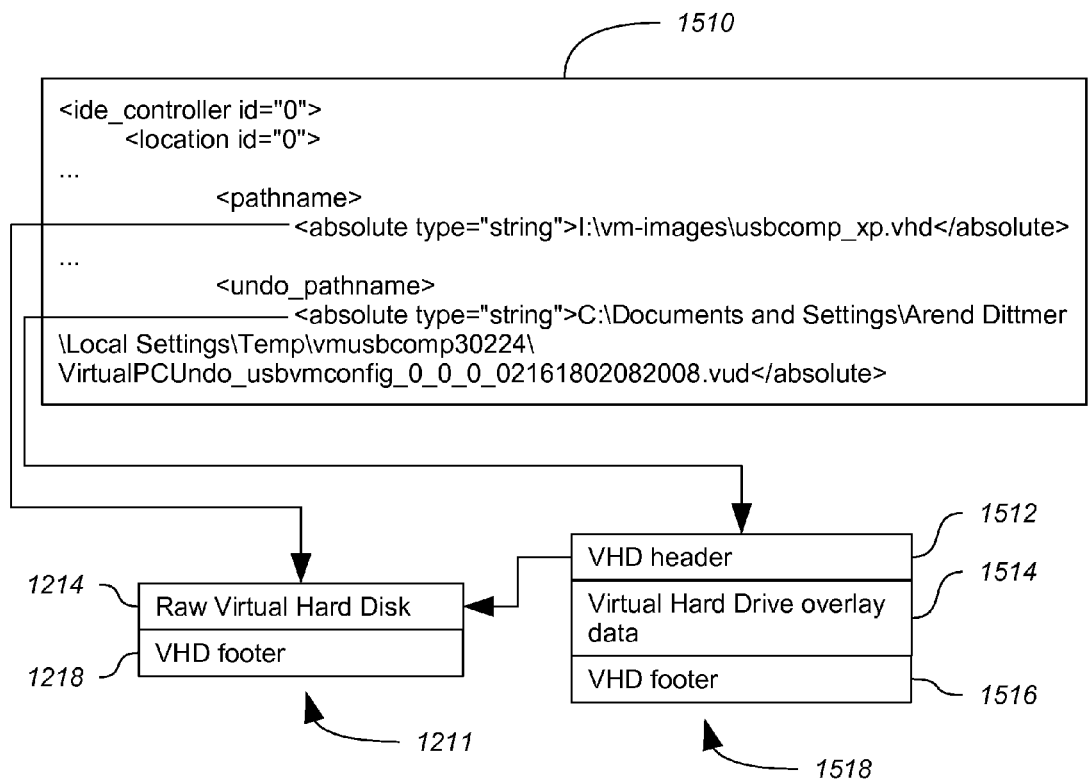

FIG. 15 shows the runtime configuration of the virtual hard disk storing system and user data in Microsoft's Virtual Hard Disk Image format. In Microsoft's terminology this is a configuration with 'enabled undo disks'. Virtual machine configuration file 1510 directly references virtual hard disk base 1211 (see also virtual hard disk base files 224 and 226 in FIG. 2). Analogous to the VMware virtual hard disk configuration, the reference to virtual hard disk overlay file 1518 (see also virtual hard disk overlay files 228 and 230 in FIG. 2) is added to the configuration file by the VMM at runtime. The header of overlay file 1512 contains a reference to the raw virtual hard disk 1211.

FIG. 16

Structure of Virtual Hard Disk Overlay File in Microsoft Format

Figure 16:
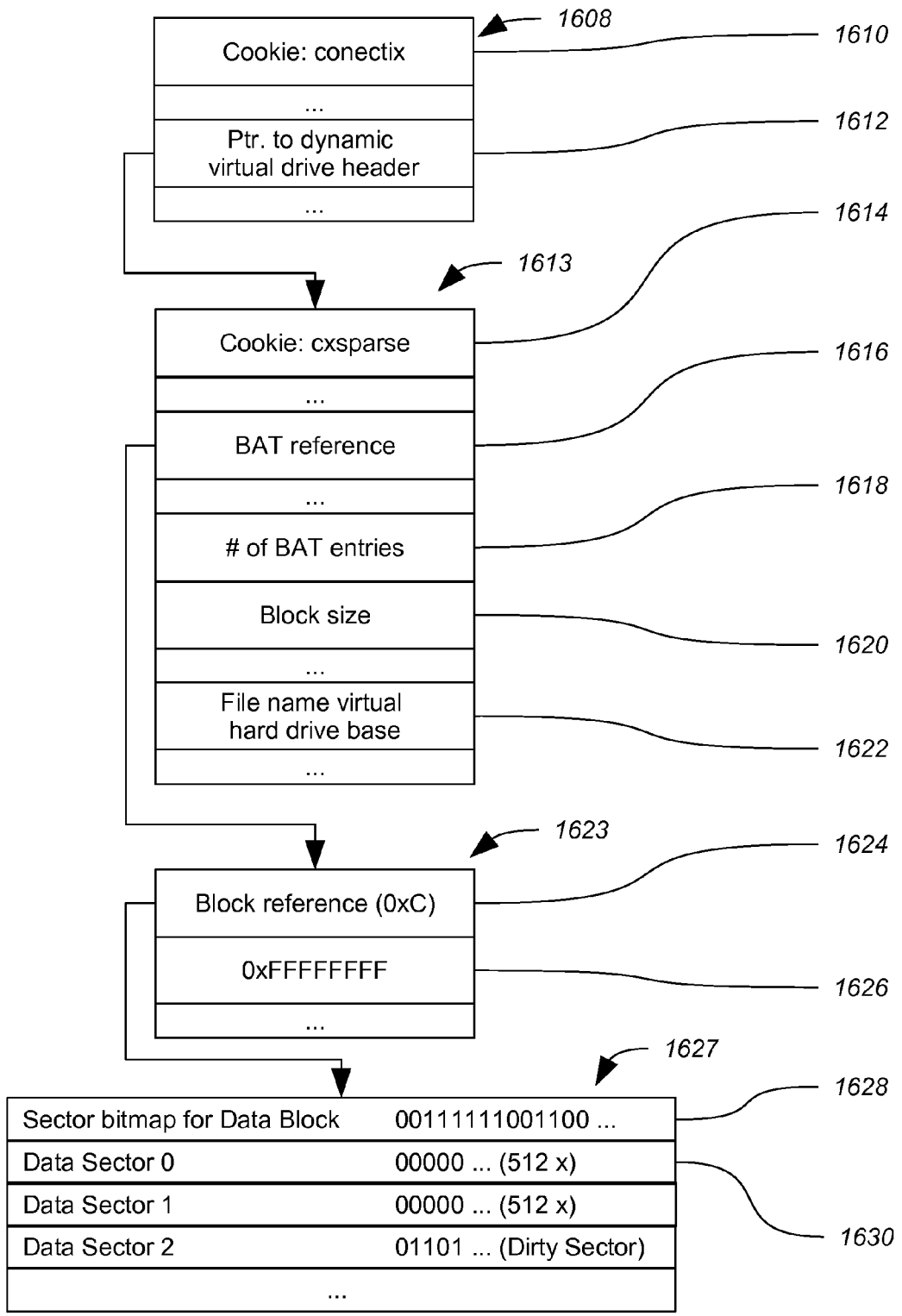
FIG. 16 is a prior-art block diagram illustrating the structure of a virtual hard disk overlay file according to version 1.0 of Microsoft's Virtual Hard Disk Image Format Specification.

FIG. 16 shows the structure of a virtual hard disk overlay file in Microsoft's Dynamic Disk Header format (Microsoft Virtual Hard Disk Image Format Specification, Version 1.0, Oct. 11, 2006). The first 512 bytes of overlay file header 1512 consist of a header data structure 1608, a copy of which is also appended at the end of the overlay file 1516. The format of this structure is the same as the format of the virtual hard disk footer at the end of virtual hard disk base 1218. This data structure contains the following relevant information: a fixed identification string 1610, also referred to as cookie, and a reference 1612 to another header structure called the dynamic disk header 1613.

The dynamic disk header is a data structure that is used in overlay files, in Microsoft's terminology called differencing disks, and in dynamically growing virtual hard disks.

The relevant information in the dynamic disk header format is another cookie containing the keyword cxsparse 1614, reference 1622 to the base image corresponding to the overlay file and a reference 1616 to a table 1623 that contains references (e.g., reference 1624) to data blocks (e.g., data block 1627) stored in the data section of the overlay file 1514. Table 1623 is called block allocation table (BAT). In case no BAT reference is required because data corresponding to the reference entry resides on the parent disk, the corresponding BAT reference entry contains the fixed value 0xFFFFFFFF (in hexadecimal format) (e.g., entry 1626). The dynamic disk header also includes the number of entries in the BAT 1618 and the size of the blocks referenced by the BAT 1620.

The first sector (512 byte) of a data block 1627 referenced by a BAT entry contains a bitmap 1628 that indicates which sectors within the data block have been modified. This first bitmap sector is followed by the data block sectors (e.g. sector 1630).

FIG. 17

Figure 17:
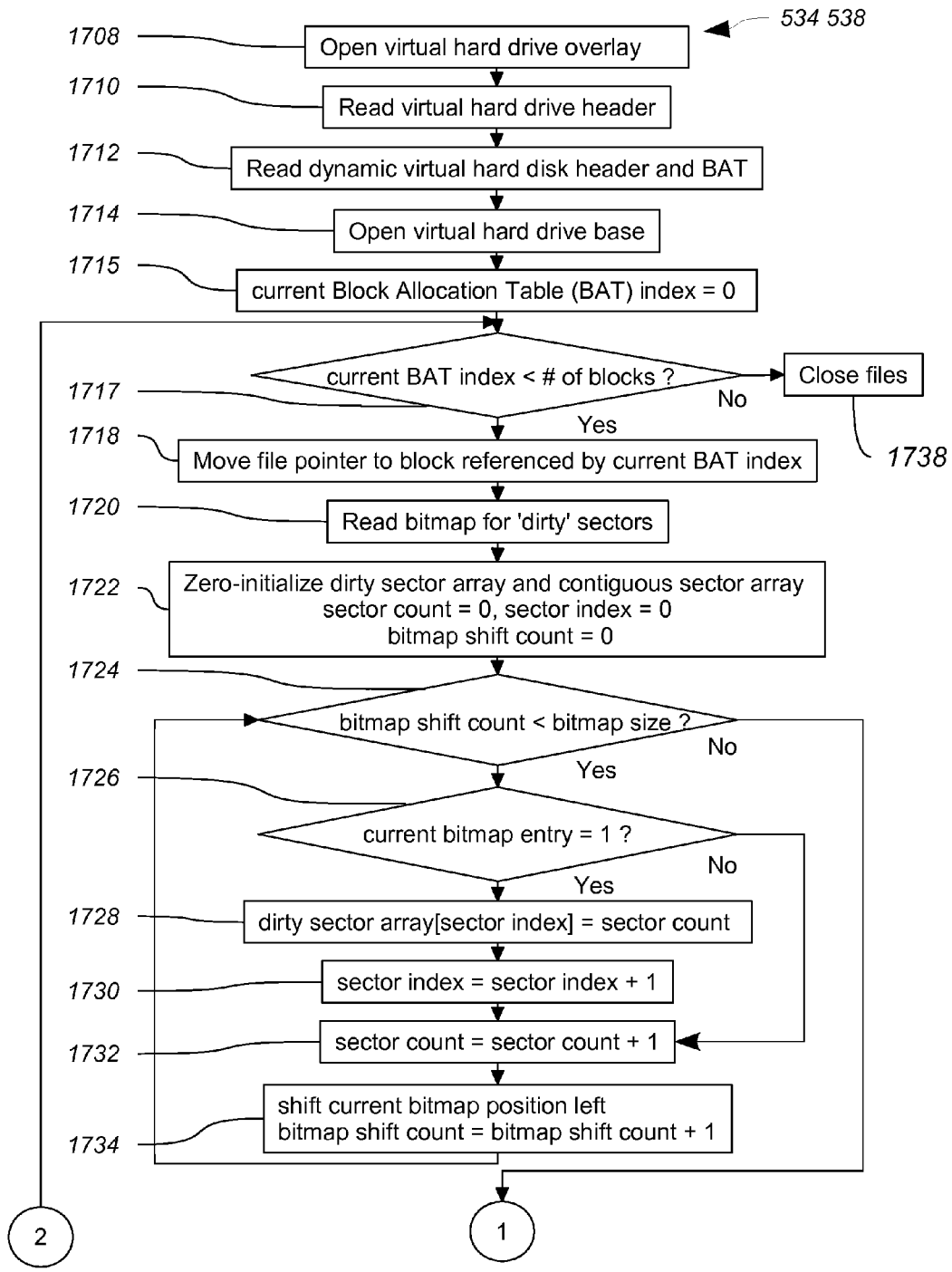
FIG. 17 shows Section 1 of a flowchart illustrating a method in which a virtual hard disk overlay file is merged with a corresponding virtual hard disk base file for a virtual hard disk in Microsoft's virtual hard disk format.
Figure 18:
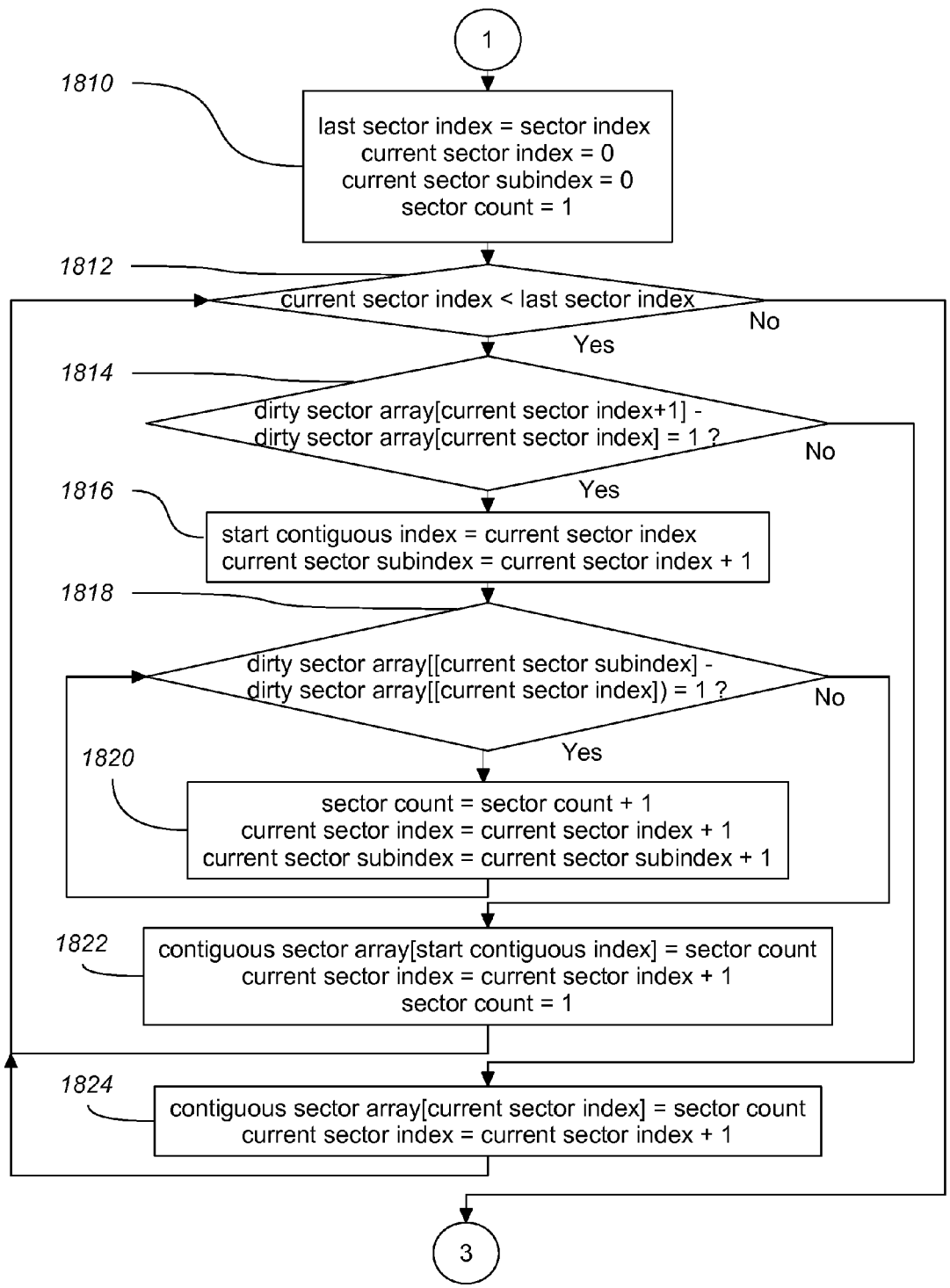
FIG. 18 shows Section 2 of a flowchart illustrating a method in which a virtual hard disk overlay file is merged with a corresponding virtual hard disk base file for a virtual hard disk in Microsoft's virtual hard disk format.
Figure 19:
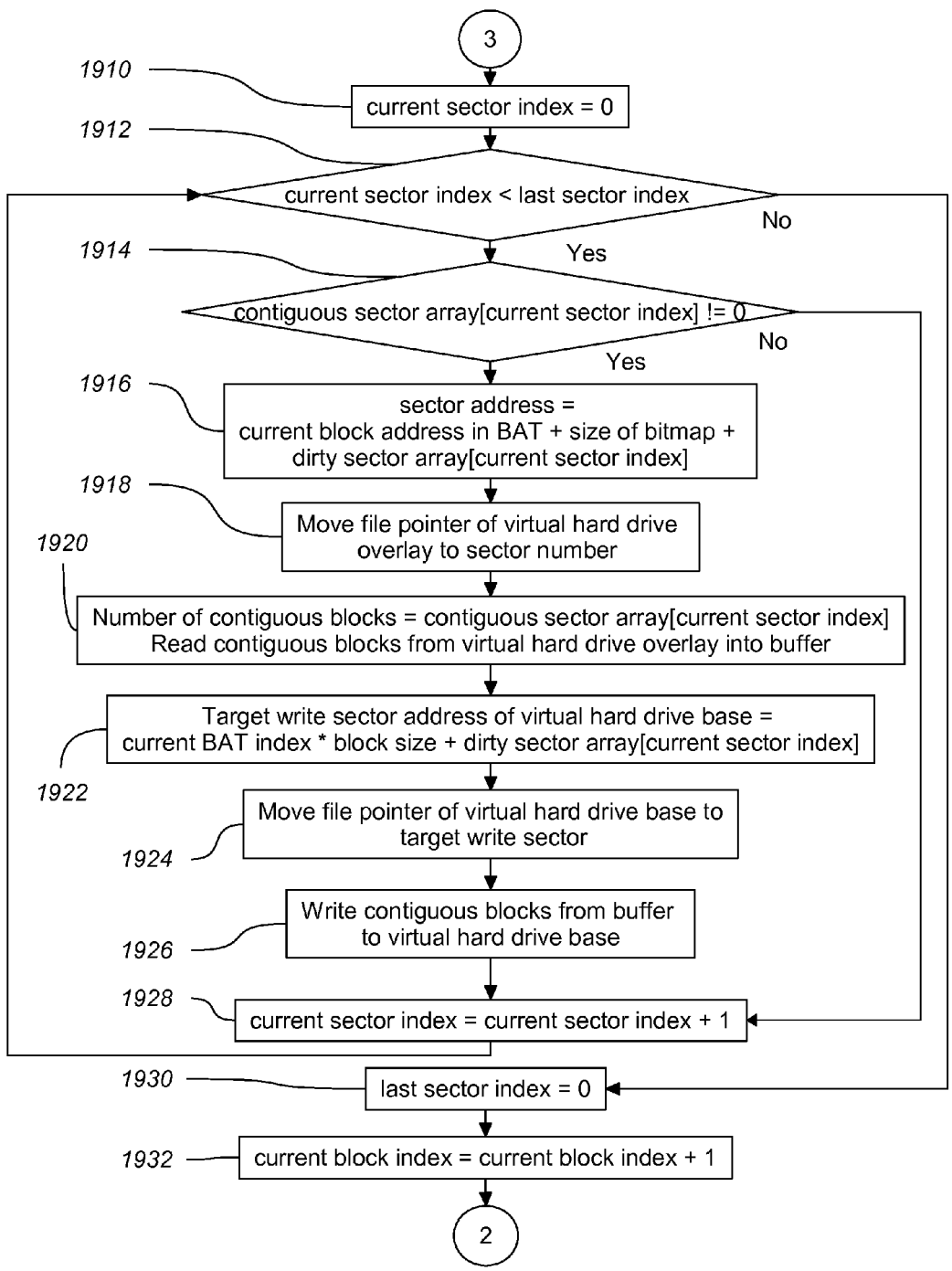
FIG. 19 shows Section 3 of a flowchart illustrating a method in which a virtual hard disk overlay file is merged with a corresponding virtual hard disk base file for a virtual hard disk in Microsoft's virtual hard disk format.

Section 1 Merge Process Flow for Virtual Hard Disk Overlay File in Microsoft Format FIGS. 17-19 show the flow of the merge operation for overlay files. First the virtual hard disk overlay file is opened (block 1708). Header 1608 and dynamic disk header 1613 are read into memory (blocks 1710 and 1712). The virtual hard disk base is opened in block 1714. The variable indexing the current block reference is set to zero (block 1715) and the program enters an outer loop 1717-1932 that traverses all block references in the BAT 1623.

The overlay file pointer is moved to the block referenced in the BAT for the current block index (block 1718). Within the outer loop, the bitmap entry at the beginning of each data block is read first (block 1720). Each position in the bitmap corresponds to one sector in the data block. The number of binary digits in the bitmap is the number of sectors in the block.

A digit 1 in the bitmap sequence indicates that the sector corresponding to the position of the digit in the bitmap contains data that was written to the overlay file. In the following steps, the bitmap is processed to create an array of sector numbers of sectors that contain overlay data (blocks 1722-1734).

This array is in the following referred to as the 'dirty sector array'. The sector numbers in the dirty sector array are numbers that identify the location of a sector within the current block. The program evaluates the bitmap stored at the beginning of the data block and creates an array entry for every sector whose corresponding bit in the bitmap is set. The sector numbers in the dirty sector array grow sequentially. The dirty sector array does not contain any empty entries.

In block 1722 the dirty sector array and a 'contiguous sector array' and variables for sector index, sector count and bitmap shift count are initialized to zero.

The loop (blocks 1724-1734) processes the bitmap by parsing the current bitmap position 1726 for all bitmap entries and adding an entry with the current sector count to the array if the current bitmap position contains an entry of 1 (block 1728). In this case the current sector count value is added to the array and the sector index is incremented (block 1730). The sector count is incremented for every processed bit in the bit map (block 1732).

After one bit has been parsed, the bit mask is shifted left, the bitmap shift count is incremented (block 1734) and the next bitmap entry is processed. This continues until the entire bitmap has been parsed (block 1724).

FIG. 18

Section 2 of Merge Process Flow for Virtual Hard Disk Overlay File in Microsoft Format The flow section in FIG. 18 creates and fills a second array called 'contiguous sector array'. This array contains the number of contiguous sectors in the dirty sector array for the corresponding start sector. This format allows the number of write operations to the virtual hard disk base to be minimized. Write operations to contiguous sectors can be easily consolidated, further increasing the longevity of the external storage device.

An example of a bitmap, the corresponding dirty sector array and the resulting contiguous sector array illustrates the concept. If the block bitmap starts with the sequence 0001111001101011110, the dirty sector array will contain the values 3, 4, 5, 6, 9, 10, 12, 14, 15, 16, as the bitmap at the corresponding positions within the block is set to 1 (the first array element is indexed with 0). The contiguous sector array contains the values 4, 0, 0, 0, 2, 0, 1, 3, 0, 0.

The first value in the contiguous sector array is four, as the corresponding position in the dirty sector array is the first sector of four contiguous sectors (3, 4, 5 and 6). The fifth value is set to two, as the dirty sector array element five, is the first sector of two contiguous sectors (9, 10) etc.

In block 1810 the variables sector index, current sector index, current sector subindex and sector count are initialized.

Decision block 1812 is the entry point for a loop that processes the dirty sector array and generates the contiguous sector array. It is first checked if the end of the dirty sector array has been reached. Block 1814 then checks if the difference between the next element in the dirty sector array (current sector index+1) and the current element is one, indicating the start of a contiguous section. In this case a loop is entered (decision block 1818, block 1820) to determine the number of contiguous blocks.

Block 1816 assigns the current sector index as the start index for a contiguous section and sets the value of the subindex to the value of the current index plus one. The subindex, current index, and the sector count are increased in block 1820 each time the difference between the sector number referenced by the subindex minus the sector number referenced by the current index is one (decision block 1818).

At the end of a contiguous set of sectors at block 1822, the contiguous sector array element referenced by the start index for the contiguous section (assigned in block 1816), is set to the number of contiguous sectors stored in the sector count.

If decision block 1814 determines that the current sector does not belong to a contiguous sector set, the sector count that was set to one in block 1810 or block 1822 is assigned to the contiguous sector array element that corresponds to the current sector index (block 1824).

FIG. 19

Section 3 of Merge Process Flow for Virtual Hard Disk Overlay File in Microsoft Format FIG. 19 shows the flow for the write operations to the virtual hard disk base. This part of the flow is a loop traversing all elements in the dirty and contiguous sector array. The current sector index is initialized to zero in block 1910.

Decision block 1912 checks if the last element in the contiguous and dirty sector array has been reached (both arrays are of the same size).

In block 1914 it is checked if the contiguous sector array for the current index contains the entry zero, which is the case if the sector corresponding to the current index is part of a contiguous section. In this case this entry has already been processed with the previous non-zero entry and the sector index can be incremented (block 1928) to process the next dirty sector array element.

In block 1916 the overlay file sector address of the dirty sector array element indexed by the current sector index is calculated.

The overlay file pointer is moved to this sector number (block 1918).

Next, the number of sectors in the contiguous block is read from the contiguous sector array element that is indexed with the current sector index. All contiguous sectors are read to a buffer (block 1920).

Next, the target write sector address in the virtual hard disk base file is determined. As the blocks are referenced linearly in the BAT the target sector number in the virtual hard disk base file can easily be calculated as shown in block 1922.

In block 1924 the file pointer of the virtual hard disk base is positioned at the calculated target write sector. The contiguous blocks (or possibly only one block) are written to the virtual hard disk base (block 1926) from the buffer filled in block 1920. The current sector index number is incremented and the program loops back to checking if the last element in the dirty and contiguous sector array has been reached (block 1912). Once the last sector has been processed the block index is increased (block 1932) and the next block is processed by closing the loop with decision block 1717.

FIG. 20

Cow Runtime Configuration of Virtual Hard Disks in Virtualbox Format

Figure 20:
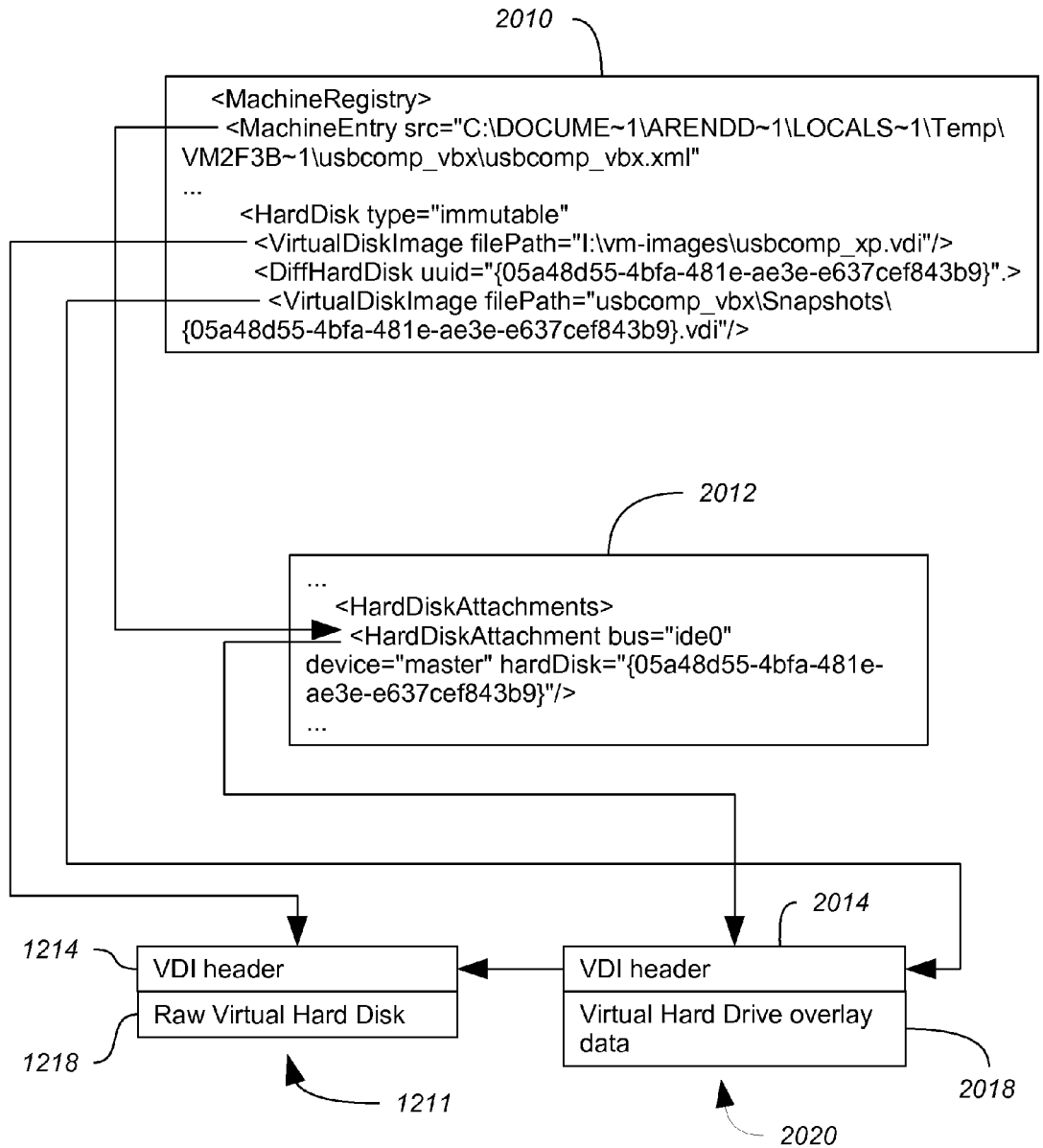
FIG. 20 is a block diagram illustrating the virtual hard disk configuration at runtime for a fixed-size, immutable virtual hard disk (VirtualBox terminology) for Sun VirtualBox, version

FIG. 20 shows the runtime configuration of the virtual hard disks storing system and user data in VirtualBox's VDI format. In VirtualBox terminology this configuration is also referred to as an 'immutable' virtual hard disk configuration. VirtualBox's global configuration file 2010 references the configuration files for virtual machine 2012, virtual hard disk base 1211, and overlay file(s) 2020. Virtual machine configuration file 2012 references virtual hard disk overlay file 2020 (see also virtual hard disk overlay files 228 and 230 in FIG. 2) through its id. Overlay file header 2014 references virtual hard disk base file 1211 (see also virtual hard disk base files 224 and 226 in FIG. 2).

FIG. 21

Structure of Virtual Hard Disk Overlay File in Virtualbox Format

Figure 21:
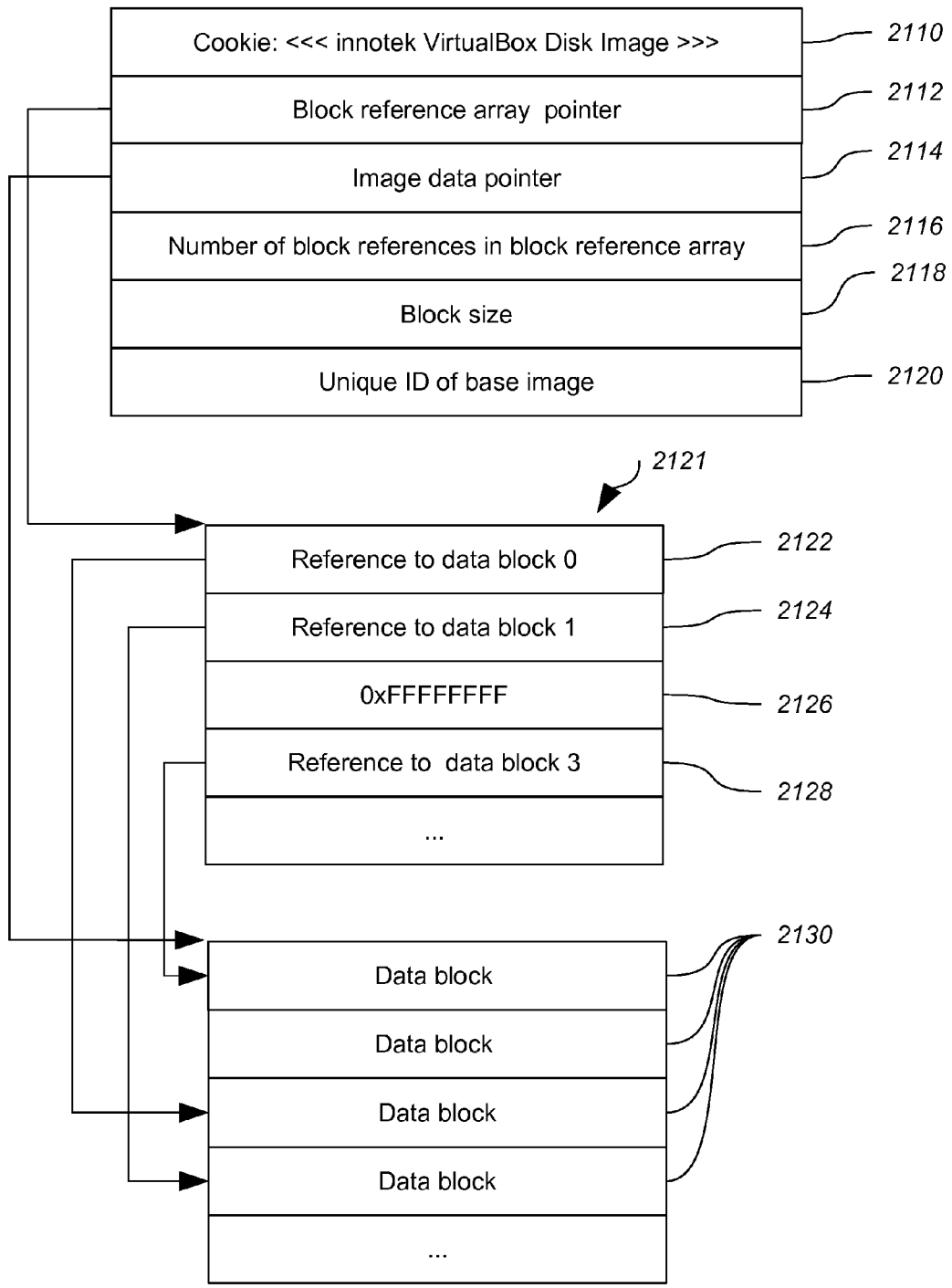
FIG. 21 is a prior-art block diagram illustrating the structure of a virtual hard disk overlay file as used by Sun VirtualBox, version 1.5.2

FIG. 21 shows the layout of the virtual hard disk overlay file in VDI format (Source Code, Sun VirtualBox 1.5.2 Open Source Edition http://www.VirtualBox.org/). At the beginning of the header a fixed string (cookie) 2110 identifies the file as VirtualBox image. Similar to the overlay formats from VMware and Microsoft, data blocks 2130 in overlay file 2020, are referenced through an array of references 2121. Unlike virtual hard disk base files in Microsoft or VMware format, virtual hard disk base files in VDI format also contain metadata information that is structured like the metadata for the overlay file.

The array index of the block reference in the overlay is the array index of the corresponding reference in the virtual hard disk base file. If, for example, block reference 2 references block 34 in the overlay, and block reference 2 references block 12 in the virtual hard disk base, block 34 in the virtual hard disk overlay corresponds to block 12 in the virtual hard disk base. Entries of 0xFFFFFFFF in the reference array of the overlay file indicate that the corresponding block is located in the virtual hard disk base file.

FIG. 22

Merge Process Flow for Virtual Hard Disk Overlay File in Virtualbox Format

Figure 22:
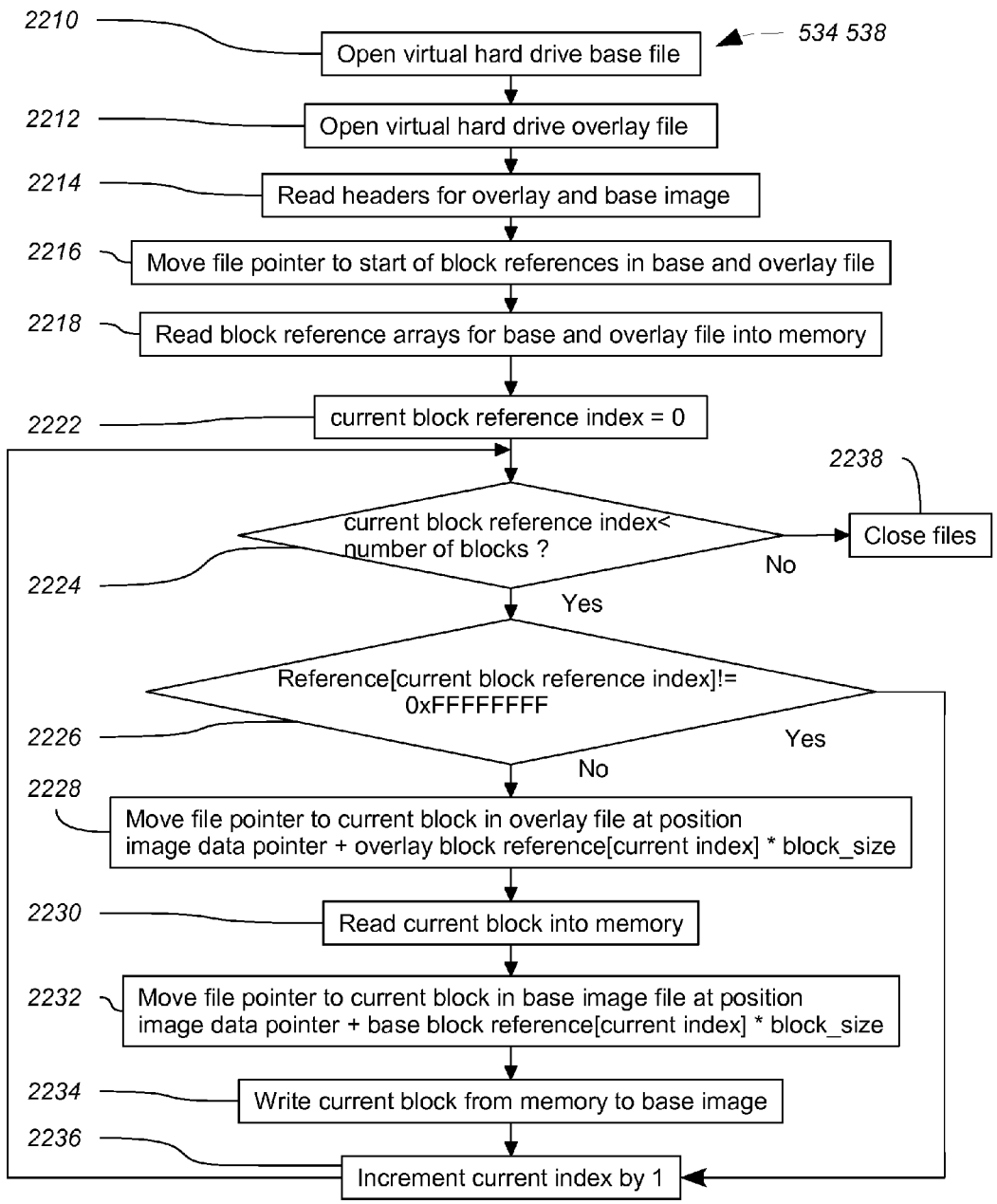
FIG. 22 shows a flowchart illustrating a method in which a virtual hard disk overlay file is merged with a corresponding virtual hard disk base file in VirtualBox's VDI format.

FIG. 22 shows the flow for merging the overlay with the virtual hard disk base file. The virtual hard disk base and overlay files are opened in blocks 2210 and 2212. The VDI headers for both files are read (block 2214) and the file pointers for overlay and base files are moved in block 2216 to the beginning of the array of block references 2121. Both arrays are read into memory at block 2218.

Next, the current block reference index is set to zero (block 2222). The execution flow then enters a loop traversing all block references in the overlay file. At decision block 2224 it is determined if the last block reference has been reached. If this is the case, virtual hard disk overlay and base file are closed (block 2238).

At block 2226 the program checks if the block reference contains the fixed value 0xFFFFFFFF that indicates that there is no block corresponding to the current index number in the overlay file. In this case, the block number is incremented (block 2236) and the loop is reentered.

In case the overlay file contains a valid reference, the overlay file pointer is positioned at the beginning of the referenced block (block 2228). Next, the current block is read into memory (block 2230). The target block in the virtual hard disk base is calculated in block 2232 analogous to block 2228. The block is written from the memory buffer to the virtual hard disk base file (block 2234). Then the current block reference index is incremented by one (block 2236) and the processing loop for the overlay blocks is reentered.

Operation

First Embodiment

The autodetection program is launched by the user after the portable storage device has been connected to the host system, typically by 'double-clicking' on the icon associated with the autodetection program. After the autodetection program has been executed, the launch program is automatically started (see also block 444). The launch program displays a GUI from which a launch command for the virtual machine can be selected (see also block 514). The selection of the launch command triggers the flow of execution outlined in FIG. 5. After the virtual machine has been shut down and depending on the selected configuration options the user may be prompted to specify whether the virtual hard disk overlay files 230 and 228 corresponding to the virtual hard disks for user and system data 212 and 210 should be merged with the corresponding virtual hard disk base files 226 and 224 (see also block 533 and block 537). If overlay file(s) are merged the launch GUI is displayed after the last merge process has completed. A progress bar indicates the progress of the merge process.

Besides the launch of the portable virtual machine other actions pertaining to the management of the portable virtual machine can be selected from the launch GUI. A backup operation of the portable virtual machine can be started. A utility for direct file copy access to the virtual hard disk for user data can be launched. The installation process of a VMM from the portable storage device can be started if no VMM has been autodetected on the host system and administrative privileges are available to the current user. The GUI also enables the user to quit the current session and automatically unregister the portable storage device with the host OS.

The GUI also provides an 'Advanced Configuration' menu for changing the virtual machine's configuration settings. In this menu a user can configure if the system should prompt for a user decision to merge overlay and base files after shutdown. The options are individually configurable for user and system data. The options are to: 1. Always merge without prompting the user 2. Prompt the user if data should be merged 3. Always discard data.

The 'Advanced Configuration' menu also allows for the configuration of 'bridged networking'. With bridged networking the portable virtual machine behaves like another physical system connected to the host system's network. The virtual machine is assigned a network address in the host system's network and is directly connected to the network infrastructure the host system is connected to. In case the host system is equipped with multiple network interface cards the 'Advanced Configuration' menu allows for the selection of the network card that is to be used for bridged networking.

In contrast, the default network configuration, referred to as Network Address Translation (NAT), 'hides' the virtual machine behind a virtual gateway on the host system. With this configuration the virtual machine is not directly exposed to the network the host system is connected to. A private network address is assigned by the host system and traffic from and to the virtual machine is forwarded by the host system. As the isolation of the virtual machine from the host's network offers security benefits and does not depend on the availability of a network address on the host's network, NAT was selected as the default configuration.

Another configuration setting that can be modified in the 'Advanced Configuration' menu is the amount of physical memory the virtual machine can use.

The 'Advanced Configuration' menu also allows for the selection of VMMs if multiple VMMs have been autodetected on the host system. For rare situations where an installed VMM could not be autodetected the 'Advanced Configuration' menu also allows for manually specifying a path to a VMM executable.

The menu also allows for changing the temporary directory that was identified in the autodetection process. A parent directory in which the temporary directory will be created can be selected through a browser. A temporary directory can be created on any file system for which the host system has write permissions. If a system is equipped with large amounts of memory and a RAM disk, it can be beneficial to refer to a directory on the respective file system. After selection of a directory different from the directory selected in the autodetection process, all files that have been created in the original temporary directory are moved to the newly created temporary directory.

Description

Other Embodiments

The first embodiment runs a Microsoft Windows XP guest OS in a virtual machine on a Microsoft Windows XP or Microsoft Windows Vista host OS. The following VMM types are supported: VMware Workstation 5.x, VMware Player, Microsoft Virtual PC and Sun VirtualBox Open Source Edition (OSE). For the first embodiment, the virtual hard disks are formatted with Microsoft's FAT32 file system.

Other possible embodiments can support other VMM types such as VMware ESX or Linux Kernel Based Virtual Machine.

Other possible embodiments can be based on different external storage devices. Almost any external storage device can be used to store virtual hard disks, programs and configuration files. The requirements are that the device can be connected to the host system, supports a file system that is recognized by the host system and provides a sufficient amount of space. Examples of possible storage devices are flash memory drives, compact flash cards, hard disk drives, portable music players and cell phones with embedded storage.

Other embodiments include the use of different guest OS'. An implementation of the launch program for a Microsoft Windows Vista guest OS will use a different program for the direct, off-line access to the virtual hard disk formatted with Microsoft's NTFS file system (Windows Vista does not support the FAT32 file system for a system image).

Another option for an alternative embodiment of the proposed configuration can use a 'pseudo' CD-ROM to automatically start the autodetection program upon plug-in of the storage device. Storage devices such as SanDisk Cruzer Micro present a small partition of storage as a CD-ROM drive to the host system. With this emulated 'pseudo' CD-ROM drive auto-start capabilities are available that don't exist for conventional flash memory devices connected to systems running Microsoft Windows.

On a Linux guest OS the system settings are not stored in a registry. The image preparation process described in FIG. 9 does not apply. With one exception, the different hardware configurations that are emulated by different VMMs are not relevant. Linux automatically recognizes the correct drivers that need to be loaded for the respective VMM. The exception is the configuration of the XFree86 X server, which displays Linux's windows system. Different VMMs emulate different types of graphics adapters that require different settings in the configuration files for the X server. In an embodiment for a Linux guest operating system, an X server configuration template for each VMM can be stored on the external storage device. Before startup of the virtual machine, the template corresponding to the selected VMM is configured with the resolution that was autodetected on the host system. Then the configuration file is copied into the virtual hard disk image. For this purpose a different direct, off-line image access program will be used that supports a Linux file system (as for example ext3).

The separation of system and user data, that was implemented through registry settings on Windows can be accomplished through mounting the system virtual hard disk as the root drive with the mount point '/' and the user data virtual hard disk with the mount point '/home' (A mount point is a directory in a file system to which a partition or other storage device is logically attached).

In other embodiments the portable virtual machine can be launched on different host systems, as for example Mac OS X, Vista, Sun (Open) Solaris and Linux. The portability of the code base and the use of the portable QT toolkit allow easy portability of the described program to multiple platforms. Other possible variations of the first embodiment are the support of additional VMMs. Any VMM supporting the concept of overlay virtual hard disks with a configurable location for the overlay file can be used as long as the emulated hardware is supported by the guest operating system.

In another embodiment the described autodetection concept for deploying virtual machines can run on VMMs from multiple vendors. The use of vendor independent virtual machine images gives enterprises the opportunity to switch vendors if desired, taking advantage of better pricing or additional features another VMM vendor may offer.

Another embodiment can extend the autodetection process to include I/O performance measurements on a variety of storage locations and dynamically configure COW to store overlay files in the location offering the best I/O performance.

Other embodiments can also use variations of the suggested method for identifying internal storage space through environment variables.

An alternative to the suggested use of environment variables on Windows systems is the sequential check of drive letters from 'A:' to 'Z:' for available space and storage locality. On host platforms that are Unix derivatives, such as Mac OS X or Linux, environment variables such as HOME or TMP can be used in conjunction with the output of the mount command to identify a suitable location for the temporary directory on internal storage.

Conclusions, Ramifications, and Scope

From the description above, a number of advantages of one or more embodiments of my autodetection and launch method for a portable virtual machine become evident:
(a) Flexibility: The OS installed in a virtual hard disk on the external storage device can be launched on one of multiple supported VMMs. The VMMs installed on the host system are autodetected
(b) Performance: Using disk space on internal storage for COW operations results in increased performance of the portable virtual machine. As operating systems constantly perform write operations on the storage mediums they were installed on the impact of faster write I/O performance on overall OS performance is very significant.
(c) Security: The system can be configured through the 'Advanced Configuration' menu to delete any modifications to the system image after shutdown while always writing user data back to the portable storage device. This configuration is well suited for the typical use case where a user accesses personal user data through an application. Potential virus infections, unknowingly installed adware or corrupted system data does not affect the system after it has been shut down as all system changes are deleted with the overlay file. Another security related benefit is the fact that a virtual machine stored on an external storage device can be launched by a user without administrative privileges.

(d) Longevity: Particularly for flash-memory-based storage devices, the number of write/erase cycles the external storage device can sustain is limited. Operating Systems constantly perform write I/O operations to (virtual) hard disk. Using COW and merging the modified blocks with the virtual hard disk base files after shutdown, reduces the number of write operations to the external storage medium significantly. A further reduction results from the fact that in the typical use case described in (c), the overlay file corresponding to the system image does not need to be merged.

(e) Optimized space usage on the external storage device: Using a separate dynamically expanding virtual hard disk for page data increases the amount of free virtual hard disk space that is available on the system image. The empty virtual hard disk stored on the portable storage device uses about 20 MB to 30 MB per VMM type. Depending upon the availability of physical memory, the page file could reduce the amount of free disk space on the system image by 500 MB to 2 GB.

While my above description contains many specificities these should not be construed as limitations on the scope, but rather as an exemplification of several preferred embodiments. Other embodiments and variations are possible.

Accordingly the scope should be determined not by the embodiments illustrated and described but the appended claims and their legal equivalent

I claim:

1. A method for dynamically generating a configuration for a virtual machine, the method comprising:
   (a) providing a computer running a host operating system, with a plurality of storage devices attached to said computer;
   (b) providing a first internal storage device out of said plurality of storage devices, said first internal storage device containing a file system;
   (c) providing a second external storage device out of said plurality of storage devices, said second external storage device storing a virtual hard disk containing an installed guest operating system;
   (d) providing a virtual machine monitor installed on said computer, said virtual machine monitor supporting copy-on-write behavior for said virtual hard disk;
   (e) providing a configuration template comprising configuration settings that are stored in a format supported by said virtual machine monitor; and
   (f) providing a plurality of instructions to be executed on said computer after said second external storage device has been connected to said computer, wherein the instructions to perform the method comprising:
      (1) autodetecting a directory in said file system on said first internal storage device,
      (2) generating configuration settings for a virtual machine controlled by said virtual machine monitor specifying predetermined configuration parameters that are read from said configuration template,
      (3) generating additional configuration settings for said virtual machine specifying that said virtual hard disk is attached to said virtual machine with said copy-on-write behavior so that a virtual hard disk overlay file corresponding to a virtual hard disk base file of said virtual hard disk is stored in said directory on said first internal storage device, wherein said virtual machine with said copy-on-write behavior redirects write operations of said guest operating system to said virtual hard disk overlay file in said directory on said first internal storage device.

2. The method of claim 1 further including providing a plurality of instructions that are executed on said computer after said virtual machine has been started and subsequently shut down comprising merging said virtual hard disk overlay file with said corresponding virtual hard disk base file, whereby data persistence for said virtual hard disk containing said installation of said guest operating system is achieved.

3. The method of claim 1, further including providing a plurality of instructions that are executed on said computer before said virtual machine is started, comprising:
   (1) determining the amount of available RAM on said computer; and
   (2) generating additional configuration settings for said virtual machine se specifying that a portion of said available RAM is configured for use by said virtual machine,
   whereby oversubscription of memory resources provided by said computer is avoided.

4. The method of claim 1 further including:
   (a) providing a second virtual hard disk stored on said second external storage device, said second virtual hard disk storing user data for said guest operating system; and
   (b) providing a plurality of instructions that are executed on said computer after said second external storage device has been connected to said computer, generating additional configuration settings for said virtual machine specifying that said second virtual hard disk is attached to said virtual machine with said copy-on-write behavior so that a second virtual hard disk overlay file corresponding to a second virtual hard disk base file of said second virtual hard disk is stored in said directory on said first internal storage device.

5. The method of claim 1 where said second storage device is a portable flash memory based storage device.

6. A computer system that dynamically generates a configuration for a portable virtual machine comprising:
   (a) a computer running a host operating system with a plurality of storage devices attached to said computer;
   (b) a first internal storage device out of said plurality of storage devices, said first internal storage device containing a file system;
   (c) a second external storage device out of said plurality of storage devices storing a virtual hard disk containing the installation of a guest operating system;
   (d) a first virtual machine monitor installed on said host operating system, said virtual machine monitor supporting copy-on-write behavior for said virtual hard disks;
   (e) a configuration template comprising configuration settings that are stored in a format by said first virtual machine monitor; and
   (f) a computer program that is executed on said computer after said second external storage device has been connected to said computer comprising a plurality of instructions for
      (1) identifying a directory in said file system on said first internal storage device,
      (2) generating configuration settings for a virtual machine controlled by said virtual machine monitor specifying predetermined configuration parameters that are read from said configuration template, (3) generating additional configuration settings for said virtual machine specifying that said virtual hard disk is attached to said virtual machine with said copy-on-write behavior so that a virtual hard disk overlay file corresponding to a virtual hard disk base file of said virtual hard disk is stored in said directory on said first internal storage device, wherein said virtual machine with said copy-on-write behavior redirects write operations of said guest operating system to said virtual hard disk overlay file in said directory on said first internal storage device.

7. The computer system of claim 6, further including:
(a) one or more hardware dependent configuration files stored on said virtual hard disk, said one or more hardware dependent configuration files enabling the execution of said guest operating system within said virtual machine emulated by a second virtual machine monitor of a different type than said first virtual machine monitor; and
(b) a computer program that is executed on said computer after said second external storage device has been connected to said computer comprising a plurality of instructions for
(1) detecting said first virtual machine monitor installed on said host operating system,
(2) extracting said one or more hardware dependent configuration files from said virtual hard disk,
(3) modifying said one or more hardware dependent configuration files to support a hardware emulated by said first virtual machine monitor, and
(4) injecting said one or more hardware dependent configuration files back into said virtual hard disk, whereby said guest operating system originally configured for execution within said virtual machine emulated by said second virtual machine monitor is configured for running within said virtual machine emulated by said first virtual machine monitor.

8. The computer system of claim 6, further including a computer program that is executed on said computer after said virtual machine has been started and subsequently shut down comprising a plurality of instructions for merging said virtual hard disk overlay file with said corresponding virtual hard disk base file, whereby data persistence for said virtual hard disk is achieved.

9. The computer system of claim 6, further including:
(a) a second virtual hard disk stored on said second external storage device, said second virtual hard disk storing user data for said guest operating system; and
(b) a computer program that is executed on said computer after said second external storage device has been connected to said computer comprising a plurality of instructions for modifying said virtual machine configuration specifying that said second virtual hard disk is attached to said virtual machine with copy-on-write behavior so that a second virtual hard disk overlay file corresponding to said second virtual hard disk is stored in said directory on said first internal storage device.

* * * * *